US010097991B2

(12) United States Patent
Tandai et al.

(10) Patent No.: US 10,097,991 B2
(45) Date of Patent: Oct. 9, 2018

(54) WIRELESS COMMUNICATION DEVICE AND METHOD FOR TRANSMITTING ENERGY BY OPTIMUM PARAMETERS

(71) Applicant: KABUSHIKI KAISHA TOSHIBA, Minato-ku, Tokyo (JP)

(72) Inventors: Tomoya Tandai, Tokyo (JP); Tsuguhide Aoki, Kanagawa (JP); Kohei Onizuka, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/457,219

(22) Filed: Mar. 13, 2017

(65) Prior Publication Data

US 2018/0084406 A1    Mar. 22, 2018

(30) Foreign Application Priority Data

Sep. 20, 2016   (JP) ................................. 2016-183411

(51) Int. Cl.
*H04W 8/24* (2009.01)
*H04W 28/02* (2009.01)
*H04W 4/00* (2018.01)
*H04W 4/80* (2018.01)

(52) U.S. Cl.
CPC ......... *H04W 8/24* (2013.01); *H04W 28/0215* (2013.01); *H04W 4/008* (2013.01); *H04W 4/80* (2018.02)

(58) Field of Classification Search
CPC ..... H04W 52/243; H04W 52/52; H02J 17/00; H02J 50/00; H02J 50/20; H02J 50/27; H02J 50/40; H02J 50/80; H04B 5/0037
See application file for complete search history.

(56) References Cited

U.S. PATENT DOCUMENTS

| 8,095,159 | B2 | 1/2012 | Oodachi et al. | |
| 9,113,446 | B2 * | 8/2015 | Morioka | H04B 7/024 |
| 2006/0234753 | A1 * | 10/2006 | Kondo | H04B 17/318 |
| | | | | 455/522 |
| 2009/0262658 | A1 * | 10/2009 | Kondo | H04B 17/318 |
| | | | | 370/252 |

(Continued)

FOREIGN PATENT DOCUMENTS

| JP | 2009-239640 A | 10/2009 |
| WO | WO-2016/175328 A1 | 11/2016 |
| WO | WO-2016/175329 A1 | 11/2016 |

OTHER PUBLICATIONS

Extended European Search Report dated Sep. 6, 2017 as issued in corresponding European Application No. 17160656.9.

(Continued)

*Primary Examiner* — Devan Sandiford
(74) *Attorney, Agent, or Firm* — Foley & Lardner LLP

(57) ABSTRACT

According to one embodiment, a wireless communication device includes: a first transmitter configured to transmit a first frame to instruct transmission prohibition to a first wireless communication device, and to transmit a signal to a second wireless communication device during a period in which the transmission is prohibited; and a first receiver configured to receive power reception amount information corresponding to the signal after the signal is transmitted.

16 Claims, 19 Drawing Sheets

(56) References Cited

U.S. PATENT DOCUMENTS

| | | | |
|---|---|---|---|
| 2012/0214534 A1* | 8/2012 | Zhu | G08C 17/02 455/517 |
| 2015/0048786 A1* | 2/2015 | Katsumata | H01M 10/44 320/108 |
| 2015/0303741 A1 | 10/2015 | Malik et al. | |
| 2015/0326068 A1 | 11/2015 | Bell et al. | |
| 2016/0118805 A1* | 4/2016 | Swope | H02J 50/12 307/104 |

OTHER PUBLICATIONS

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11 ac™, The Institute of Electrical and Electronics Engineers, Inc., Dec. 2013, pp. 1-425.

Stacey, Robert: "Specification Framework for TGax", IEEE 11-15-0132-17-00ax-spec-framework, Intel, May 2016, pp. 1-61.

* cited by examiner

|  | FIRST WEIGHT PARAMETER | SECOND WEIGHT PARAMETER | ... | K-th WEIGHT PARAMETER |
|---|---|---|---|---|
| TERMINAL A | $1 \times 10^{-9} \mu$ Ah | $8 \times 10^{-9} \mu$ Ah |  | $3 \times 10^{-9} \mu$ Ah |

FIG. 8

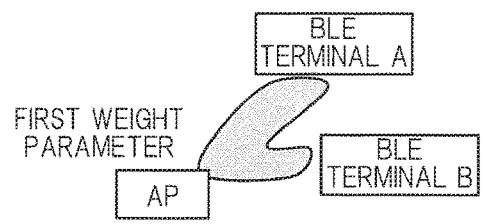

FIG.10

| | CURRENT CONSUMPTION | FIRST WEIGHT PARAMETER | SECOND WEIGHT PARAMETER | THIRD WEIGHT PARAMETER |
|---|---|---|---|---|
| BLE TERMINAL A | $2 \times 10^{-9} \mu A$ | $7 \times 10^{-9} \mu Ah$ | $2 \times 10^{-9} \mu Ah$ | $1 \times 10^{-9} \mu Ah$ |
| BLE TERMINAL A | $10 \times 10^{-9} \mu A$ | $3 \times 10^{-9} \mu Ah$ | $5 \times 10^{-9} \mu Ah$ | $2 \times 10^{-9} \mu Ah$ |
| BLE TERMINAL C | $4 \times 10^{-9} \mu A$ | $1 \times 10^{-9} \mu Ah$ | $4 \times 10^{-9} \mu Ah$ | $9 \times 10^{-9} \mu Ah$ |

| | FIRST WEIGHT PARAMETER | SECOND WEIGHT PARAMETER | THIRD WEIGHT PARAMETER |
|---|---|---|---|
| BLE TERMINAL A | $3.5 \times 10^{-9} h$ | $1 \times 10^{-9} h$ | $0.5 \times 10^{-9} h$ |
| BLE TERMINAL B | $0.3 \times 10^{-9} h$ | $0.5 \times 10^{-9} h$ | $0.2 \times 10^{-9} h$ |
| BLE TERMINAL C | $0.25 \times 10^{-9} h$ | $1 \times 10^{-9} h$ | $2.25 \times 10^{-9} h$ |
| SHORTEST | $0.25 \times 10^{-9} h$ | $0.5 \times 10^{-9} h$ | $0.2 \times 10^{-9} h$ |

FIG.11

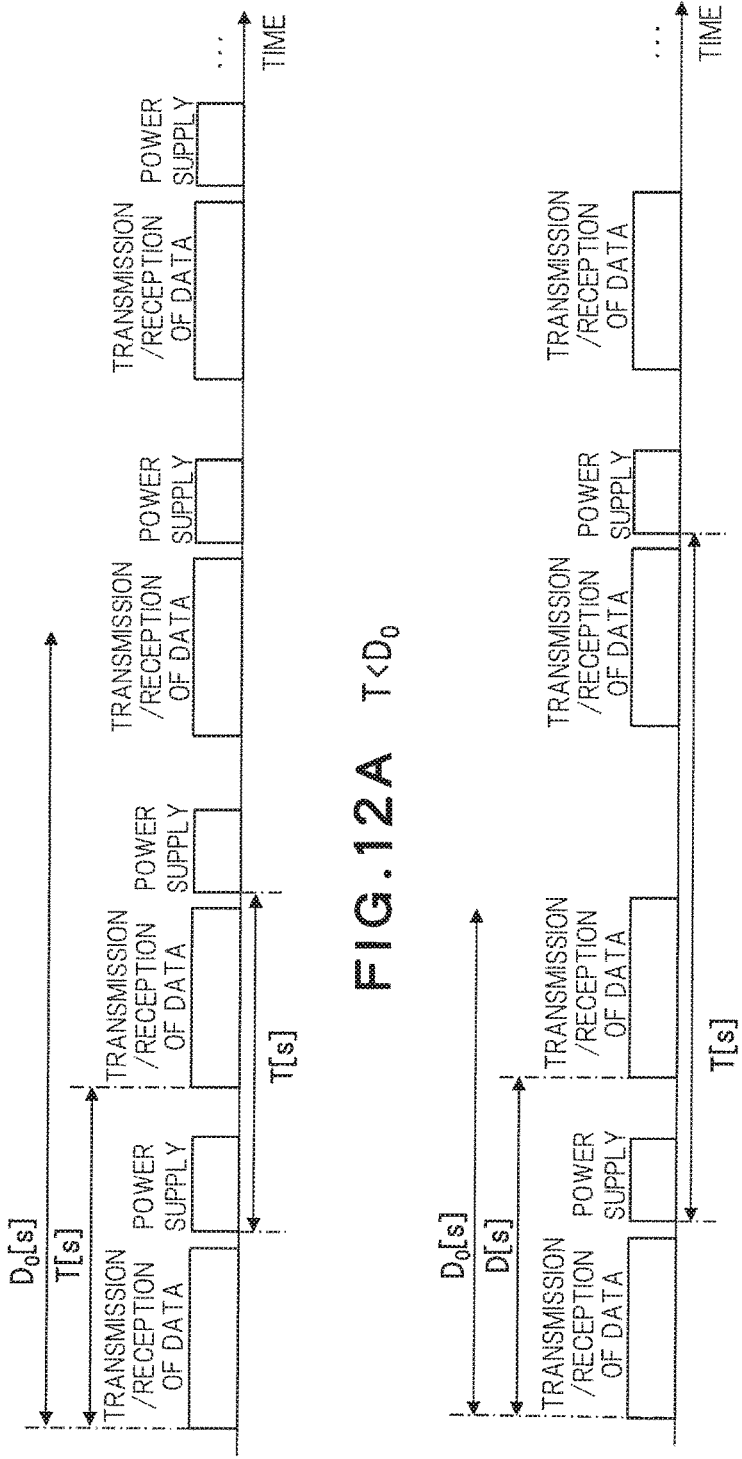

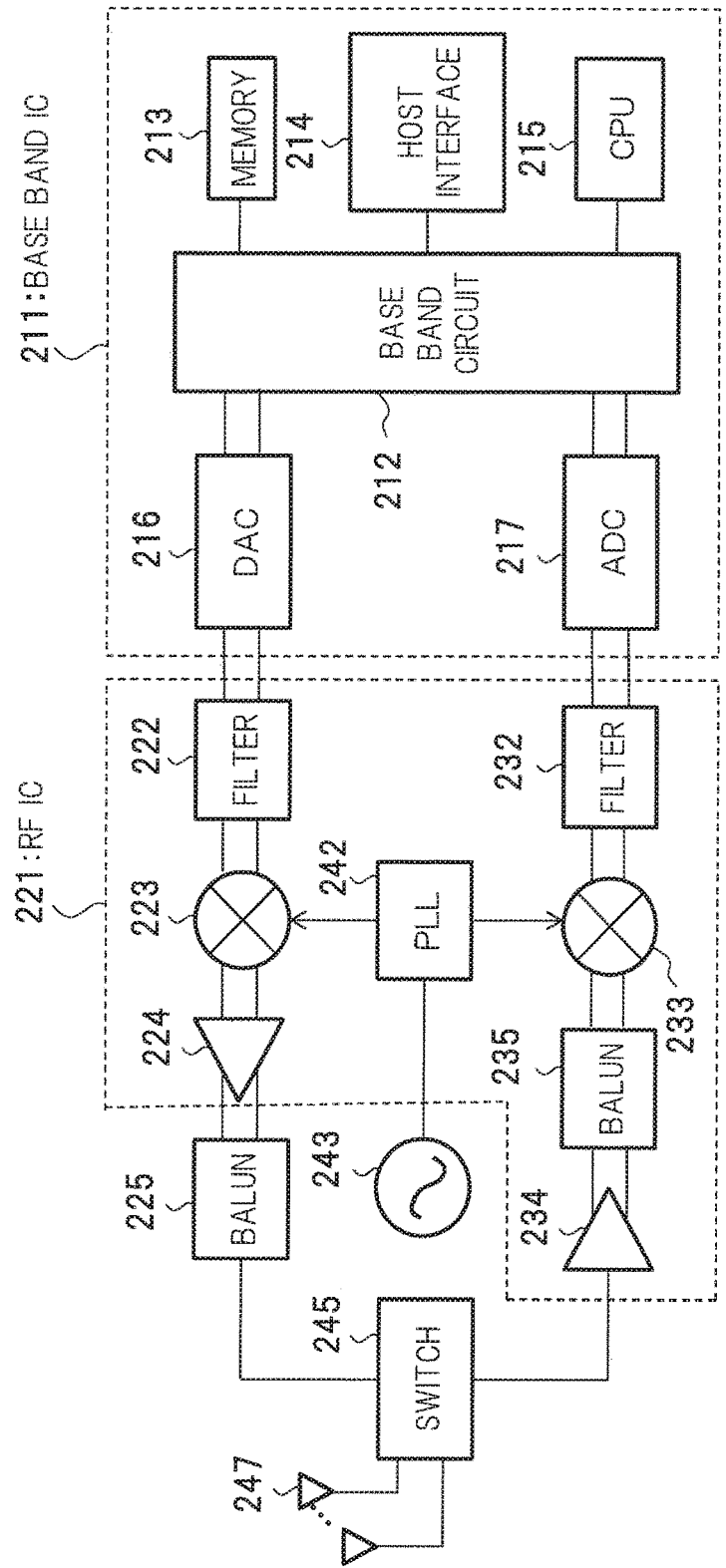
F I G. 23

WIRELESS COMMUNICATION DEVICE AND METHOD FOR TRANSMITTING ENERGY BY OPTIMUM PARAMETERS

CROSS-REFERENCE TO RELATED APPLICATIONS

This application is based upon and claims the benefit of priority from Japanese Patent Application No. 2016-183411, filed on Sep. 20, 2016; the entire contents of which are incorporated herein by reference.

FIELD

Embodiments according to the present invention relates to a wireless communication device and a wireless communication method.

BACKGROUND

As a technique for determining a frequency to be used for power reception, from among one or more frequency candidates, the following has been known. A certain terminal (a terminal to receive power) receives first information including one or more frequency candidates from another terminal. The terminal to receive power receives a microwave which is transmitted, as a frequency candidate included in the first information, from the other terminal, and measures DC energy which is obtained by performing DC conversion on the energy of the microwave. The terminal to receive power identifies an optimum frequency at which the DC energy becomes maximum, among the one or more frequency candidates, and transmits, to the other terminal, second information including the identified optimum frequency.

In this technique, when a separate communication system uses a frequency in a bandwidth including the above frequency candidates, the terminal to receive power may receive radio waves transmitted from the separate communication system. In this case, the terminal to receive power cannot accurately measure the energy of radio waves received from the other terminal, and thus, cannot identify the optimum frequency.

BRIEF DESCRIPTION OF THE DRAWINGS

FIG. 8 shows a result obtained through K-times measurement of a power reception amount;

FIG. 10 a schematic diagram illustrating a case where wireless power supply is simultaneously performed to a plurality of BLE (Bluetooth Low Energy) terminals;

FIG. 11 shows an example of selecting weight parameters satisfying requests from a plurality of BLE terminals;

FIGS. 12A and 12B show examples of scheduling;

FIG. 23 illustrates a hardware configuration example of a wireless communication device installed in an access point, a wireless LAN terminal, or a BLE terminal according to an eleventh embodiment.

DETAILED DESCRIPTION

According to one embodiment, a wireless communication device includes: a first transmitter configured to transmit a first frame to instruct transmission prohibition to a first wireless communication device, and to transmit a signal to a second wireless communication device during a period in which the transmission is prohibited; and a first receiver configured to receive power reception amount information corresponding to the signal after the signal is transmitted.

Hereinafter, embodiments of the present invention will be described with reference to the drawings.

First Embodiment

Figure 1:
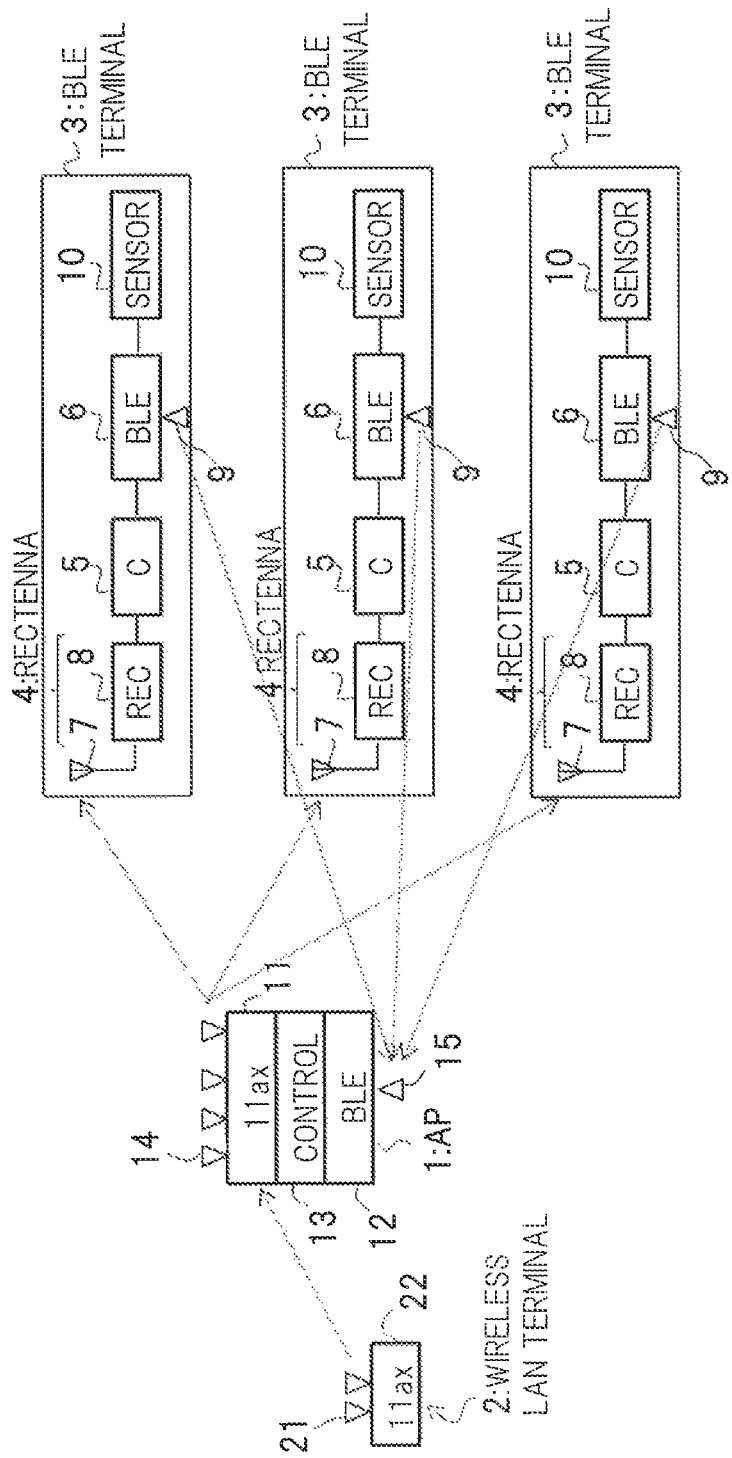
FIG. 1 is an overall configuration example diagram of a system according to a first embodiment.

FIG. 1 is an overall configuration example diagram of a system according to the present embodiment. An outline of the present embodiment will be described with reference to FIG. 1. The system in FIG. 1 includes an access point (AP) 1 which is a base station, a wireless LAN (WLAN) terminal 2 which is a station (STA), and a plurality of BLE terminals 3. In the drawing, the number of the wireless LAN terminal 2 is one, but the number may be two or more. Also, the number of the BLE terminals 3 is not limited to two or more, but may be one.

The AP 1 is assumed to be a wireless LAN device in compliance with IEEE802.11ax standard, which is a next-generation wireless LAN (Local Area Network) standard. IEEE802.11ax standard is an example, and the AP 1 may conform to the past legacy standards (IEEE802.11ac, IEEE802.11n, IEEE802.11a, etc.). Further, the AP 1 can perform not only communication in compliance with a wireless LAN communication scheme but also communication in compliance with the Bluetooth Low Energy (BLE) scheme. The AP 1 includes a communication circuit (11ax circuit) 11 for the wireless LAN, a communication circuit (BLE circuit) 12 for BLE, and a control circuit 13 that controls the 11ax circuit 11 and the BLE circuit 12. The access point 1 includes one or a plurality of wireless LAN antennas 14 and a BLE antenna 15. A wireless communication device installed in the AP 1 includes the communication circuits 11, 12 and the control circuit 13.

The wireless LAN terminal 2 is a communication device that performs wireless LAN communication. Specifically, the wireless LAN terminal 2 performs communication in compliance with IEEE802.11ax standard, and thus, includes a 11ax circuit 22. For example, the wireless LAN terminal 2 is a camera having a communication function, a LIDAR (Light Detection And Ranging) device, or the like. The wireless LAN terminal 2 includes one or a plurality of antennas 21 for wireless LAN communication. A wireless communication device installed in the wireless LAN terminal 2 includes the 11ax circuit 22.

Each of the BLE terminals 3 is a communication device that performs BLE communication. Each of the BLE terminals 3 includes a rectenna (rectifying antenna) 4, a capacitor 5, a BLE circuit 6, an antenna 9 for BLE communication, and a sensor 10. The rectenna 4 includes an antenna 7 and a rectifying circuit 8.

In an example, the AP 1, the BLE terminals 3, and the wireless LAN terminal 2 are installed in an automobile. An automobile is an example, and the AP 1, the BLE terminals 3, and the wireless LAN terminal 2 may be installed in a facility such as a factory, or other sites. The following description will be given assuming the case of an automobile. As the wireless LAN terminal 2, a camera is assumed. As the BLE terminals 3, sensor devices selected from among various types are assumed. Examples of a sensor for automobiles include a tire pneumatic sensor and an engine temperature sensor, but the sensor devices are not limited thereto.

The AP 1 operates using a battery installed in the automobile or in the AP 1. The wireless LAN terminal 2 operates using a battery installed in the automobile or in the wireless LAN terminal 2. On the other hand, the BLE terminals 3 each receive a wireless LAN signal from the AP 1 through the antenna 7, and convert the signal into DC energy at the rectifying circuit 8, and store the energy in the capacitor 5. The BLE circuit 6 operates on the basis of the energy stored in the capacitor 5. That is, to communicate with the BLE circuit 12 of the AP 1, the BLE circuit 6 operates using, as an energy source, charge stored in the capacitor 5. When the AP 1 includes a plurality of antennas, the AP 1 can wirelessly supply power to the BLE terminals 3 by sending beams which are radio waves each having directivity. When the directivity of each antenna is changeable, the directivity may be controlled through adjustment of the setting of the antenna.

In an operation example, the AP 1 receives a fixed or arbitrary size of image data from the wireless LAN terminal 2 regularly or at an arbitrary timing through wireless LAN communication. The AP 1 stores the received image data in an internal storage thereof, and displays the data on a display (not illustrated, e.g., a car navigation screen) or performs image analysis on the data. Furthermore, the AP 1 transmits wireless LAN signals to the BLE terminals 3 to wirelessly supply power to the BLE terminals 3. Moreover, through BLE communication, the AP 1 regularly collects sensor data from the wireless LAN terminal 2, and collects power reception information indicating a power reception state. The AP 1 performs control of power supply to the BLE terminals 3 by using the power reception information. In an example of the control of power supply, the wireless LAN terminal 2 controls parameters (power supply parameters) for wireless power supply so as to enhance transmission efficiency. For example, control of a beam to be transmitted to the wireless LAN terminal 2, control of a modulation scheme, control of a radio frequency channel to be used (hereinafter, "channel"), control of a bandwidth to be used, and the like are performed. A signal for power supply, which is transmitted by the AP 1, does not need to be in a form of a frame defined by the wireless LAN.

Here, a frequency band region used by the wireless LAN differs from that used by the BLE. For example, the wireless LAN uses a band region of 5 GHz whereas the BLE uses a band region of 2.4 GHz. Accordingly, the wireless LAN does not interfere with the BLE.

The present embodiment has a characteristic in which the AP 1 efficiently performs wireless power supply to the BLE terminals 3. In a case where the present system is installed in an automobile, if an engine has not been started for a long time, the capacitors of the BLE terminals 3 are not considered to having charge required for BLE communication and sensing operations stored therein. The AP 1 and the BLE terminals 3, which operate using energy from the battery, can operate immediately after receiving supply of energy at start of the engine. On the other hand, the BLE terminals 3, which each operate by wireless power supply from the AP 1, need to receive wireless power supply as soon as possible (Phase 1).

After the engine is started and the AP 1, the BLE terminals 3, and the wireless LAN terminal 2 become operable, it is necessary to set parameters (power supply parameters) for wireless power supply to optimum ones so as to match the in-vehicle environment, as soon as possible. A radio wave propagation environment varies depending on the open/close state of a vehicle door or the number of passengers, for example. Accordingly, optimum beams to be formed for the BLE terminals 3 also vary depending on the environment. Therefore, the power supply parameters need to be quickly changed depending on variation in the environment such as the open/closed state of a door and the number of passengers, etc. (Phase 2).

After the in-vehicle environment becomes a stable steady state, scheduling needs to be performed such that regular update of the power supply parameters is performed to satisfy power supply requests from the BLE terminals 3 and to satisfy a data transfer request from the wireless LAN terminal 2 (Phase 3).

In the present embodiment and embodiments described later, one or more of the Phases are considered.

Figure 2:
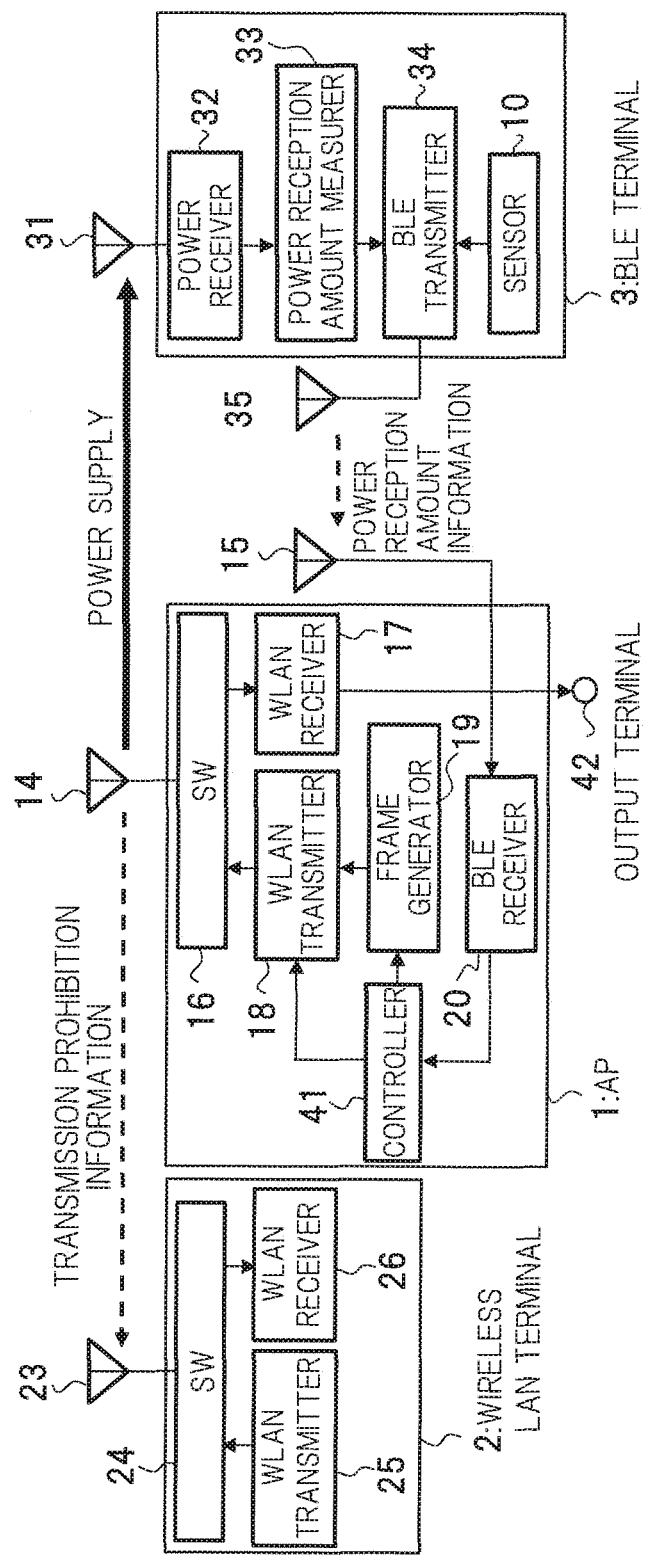
FIG. 2 is a block diagram of a wireless communication system according to the first embodiment.

FIG. 2 is a block diagram of a wireless communication system according to the present embodiment. In the present embodiment, components having the same names throughout the drawings are denoted by the same reference numerals and the overlapping explanations thereof are omitted, as appropriate.

The wireless communication system includes the AP 1, the wireless LAN terminal 2, and the BLE terminal 3.

A wireless communication device installed in the AP 1 includes one or a plurality of the antennas 14 for wireless LAN communication, a switch 16, a WLAN receiver 17, a WLAN transmitter 18, a frame generator 19, one or a plurality of the BLE antennas 15, a BLE receiver 20, a controller 41, and an output terminal 42. The AP 1 performs communication in compliance with IEEE802.11ax and communication in compliance with the BLE.

The switch 16 switches the antenna 14 between the WLAN transmitter 18 and the WLAN receiver 17.

The frame generator 19 generates a MAC frame (hereinafter, "frame") to be transmitted to the wireless LAN terminal 2. IEEE802.11 standard frames are broadly categorized into data frames, management frames, and control frames. Any of the frames may be generated by the frame generator 19. A beacon frame to be regularly transmitted by the AP 1 in order to give a notification of the attribute or synchronization information of the AP 1 is a management frame. Examples of a control frame include an RTS (Request to Send) frame for requesting transmission from a counterpart terminal, a CTS (Clear to Send) frame for giving transmission permission, an ACK frame which is an acknowledgement response frame, and a BA (Block Ack) frame. The aforementioned examples are some of examples, and there are other various frames.

The WLAN transmitter 18 transmits the frame generated by the frame generator 19 through the antenna 14. Practically, the frame is packetized with added physical layer headers, and the packets are transmitted. The WLAN transmitter 18 performs error correction coding and modulation on the frame (more specifically, the packets) to generate a modulated signal. The modulated signal is converted into an analog signal. The WLAN transmitter 18 generates a signal of a constant frequency by using an oscillator and a PLL (Phase Locked Loop) circuit, and up-converts, with a transmission mixer, the analog signal into a signal of a radio frequency on the basis of the signal of the constant frequency. The WLAN transmitter 18 amplifies the up-converted signal by using an RF amplifier, and transmits, as radio waves, the amplified signal through the antenna to the air. In this way, the frame (packets) of a radio frequency is transmitted.

Under the control by the controller 41, the WLAN transmitter 18 generates a power supply signal which is a radio signal for wireless power supply, and transmits the power supply signal through the antenna 14. More specifically, the WLAN transmitter 18 generates a power supply signal in accordance with power supply parameters given by the controller 41. An output signal from an oscillator or a PLL circuit, which is to be used in transmission of a frame, is used to generate a power supply signal. A power supply signal can be generated by a transmission mixer multiplying power supply data which corresponds to the power supply parameters, to the output signal. Alternatively, a signal source for power supply signals may be prepared to generate a power supply signal from power supply parameters using the signal source.

The controller 41 controls communication with the wireless LAN terminal 2 by using the frame generator 19. Further, the controller 41 controls power supply parameters. An example of control of power supply parameters will be given. In a case where a plurality of antennas are used for transmission, a weight for a transmission signal of each antenna may be controlled. In addition, a modulation scheme or a modulation and coding scheme (MCS) may be controlled. Alternatively, a channel to be used may be controlled. That is, since a plurality of channels are arranged in a wireless LAN band, and which channel is to be used may be controlled. When the band width can be expanded by coupling a plurality of channels, the band width may be controlled. The examples described above are some of examples, and other various control of power supply parameters may be performed.

As a power supply signal to the BLE terminal 3, a transmission signal of a frame generated by the frame generator 19 may be used. For example, a signal of a beacon frame may be used as a signal for wireless power supply. Alternatively, a frame for wireless power supply may be defined to be transmitted as a power supply signal.

The WLAN receiver 17 acquires a frame by demodulating the signal received from the wireless LAN terminal 2. More specifically, the signal received through an antenna is inputted to the WLAN receiver. The WLAN receiver 17 amplifies the received signal by using an LNA (Low Noise Amplifier). The WLAN receiver 17 performs down-conversion on the amplified signal on the basis of a signal having a fixed frequency generated by an oscillator and a PLL circuit. On the basis of the down-converted signal, a signal of a desired band is extracted using a filter for reception. The WLAN receiver 17 demodulates and decodes the extracted signal to obtain a frame (more specifically, packets).

When the obtained frame is a data frame, the WLAN receiver 17 outputs data included in the data frame through the output terminal 42. The output terminal 42 is an interface for outputting a frame received by the WLAN receiver 17, to an upper layer or a buffer relative to the upper layer. The WLAN receiver 17 operates according to the type of a received frame, and outputs the analysis result of the frame to the frame generator 19 or the controller 41. For example, to transmit an acknowledgement response, information necessary for the acknowledgement response is outputted to either or both of the frame generator 19 and the controller 41 such that the acknowledgement response frame is transmitted after elapse of a predetermined time since completion of the reception.

The BLE receiver 20 performs communication in compliance with BLE. The BLE receiver 20 receives data or information from the BLE terminal 3 through the BLE antenna 15. For example, the BLE receiver 20 receives sensor data detected by the BLE terminal 3. The BLE terminal 3 receives information (power reception amount information) regarding the power reception amount from the AP 1. The BLE receiver 20, which is connected to the controller 41, supplies the power reception amount information to the controller 41. The BLE receiver 20 may transmit sensor data to an in-vehicle monitoring device (not illustrated). The monitoring device checks whether a sensed point has an abnormality or not on the basis of the sensor data. The controller 41 may further serve such a monitoring device. If so, the BLE receiver 20 supplies sensor data to the controller 41.

In an example, the WLAN transmitter 18, the WLAN receiver 17, and the frame generator 19 correspond to the 11ax circuit included in the AP 1 in FIG. 1. In an example, the controller 41 corresponds to the control circuit 13 included in the AP 1 in FIG. 1. In an example, the BLE receiver 20 corresponds to the BLE circuit 12 included in the AP 1 in FIG. 1.

A wireless communication device installed in the wireless LAN terminal 2 includes a wireless LAN antenna 23, a switch 24, a WLAN transmitter 25, and a WLAN receiver 26. The switch 24 switches the antenna 23 between the WLAN transmitter 25 and the WLAN receiver 26. The WLAN transmitter 25 transmits a frame generated in the terminal, through the antenna 23. The WLAN receiver 26 receives frames from the AP 1 and other terminals in compliance with the wireless LAN. The wireless LAN terminal 2 performs communication in compliance with IEEE802.11ax. The WLAN transmitter 25 and the WLAN receiver 26 have the same functions as those of the WLAN transmitter 18 and the WLAN receiver 17 of the AP 1, respectively. In an example, the WLAN transmitter 25 and the WLAN receiver 26 correspond to the 11ax circuit 22 included in the wireless LAN terminal 2 in FIG. 1.

A wireless communication device installed in the BLE terminal 3 includes a wireless LAN antenna 31, a power receiver 32, a power reception amount measurer 33, a BLE transmitter 34, a BLE antenna 35, and the sensor 10. The power receiver 32 receives a power supply signal transmitted from the AP 1 through the wireless LAN antenna 31, and rectifies (converts) the received power supply signal to DC current. The power receiver 32 charges the capacitor 5 with the converted DC current. The power reception amount measurer 33 measures an amount of received power (power reception amount). An amount of power refers to an electric energy or an amount of charge. A power reception amount may be measured by an arbitrary method. For example, a power reception amount may be measured according to change in the voltage of the capacitor between before and after measurement. More specifically, a power reception amount may be measured from a voltage difference and a capacitance value. The BLE transmitter 34 performs communication in compliance with BLE. The BLE transmitter 34 transmits information (power reception amount information) about a measured power reception amount through the BLE antenna 35. Here, the value of a measured power reception amount is transmitted as power reception amount information. However, a change value of the voltage of the capacitor 5 may be transmitted. In a case where the AP 1 side grasps the characteristics of the capacitor 5, the AP 1 may calculate a power reception amount from the change value of the voltage. As another example of power reception amount information, determination information on whether or not a measured power reception amount satisfies a value requested from the BLE terminal 3 may be used. In an example, the antenna 31 and the power receiver 32 correspond to the rectenna 4 and the capacitor 5 included in each BLE terminal 3 in FIG. 1. In an example, the power reception amount measurer 33 and the BLE transmitter 34 correspond to the BLE circuit 6 included in each BLE terminal 3 in FIG. 1.

Figure 3:
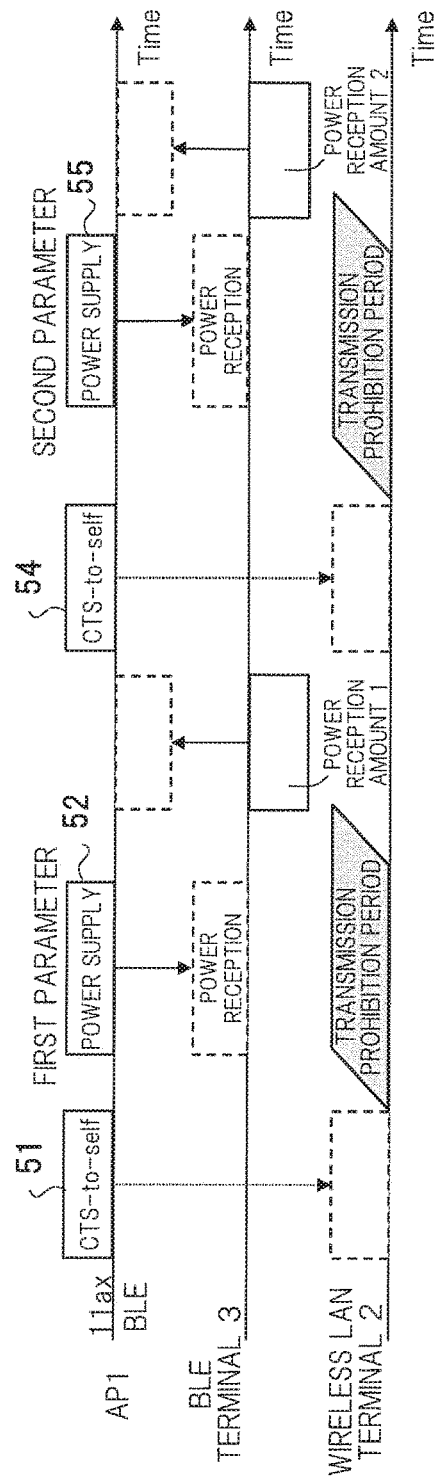
FIG. 3 is a sequence diagram of the wireless communication system in FIG. 2.

FIG. 3 is a sequence diagram of the wireless communication system in FIG. 2. FIG. 3 shows operations of the AP 1, the BLE terminals 3, and the wireless LAN terminal 2 along respective time axes. The upper side relative to each time axis shows operations in 11ax, and the lower side shows operations in BLE. The present sequence has a characteristic in which the AP 1 transmits a transmission prohibition instruction frame (here, a CTS-to-self frame) to prohibit the wireless LAN terminal 2 form performing a transmission operation, and the AP 1 performs wireless power supply to the BLE terminal 3 during the prohibition. Accordingly, during power supply from the AP 1 to the BLE terminal 3, transmission performed by the wireless LAN terminal 2 is suppressed. Therefore, the BLE terminal 3 can highly accurately measure energy received from the AP 1. The power reception amount information based on the measurement is fed back to the AP 1 side, and thereby, the AP 1 can calculate a power supply parameter appropriate for the BLE terminal 3. The present sequence will be described in detail below.

First, the AP 1 acquires an access right to a wireless medium in accordance with CSMA/CA (Carrier Sense Multiple Access with Collision Avoidance). Specifically, the AP 1 performs carrier sensing for a waiting time, which is the total time of a fixed duration and a randomly determined back-off time. When determining that the state of the wireless medium is idle, the AP 1 acquires an access right. The AP 1 transmits a CTS-to-self frame 51 on the basis of the access right. A CTS-to-self frame is a CTS frame of which the receiver address (RA) field is set to the address of a transmitter terminal (that is, the BSSID of the AP 1). A terminal having received the CTS-to-self frame 51 is prohibited from performing transmission for a time period set in the Duration/ID field of the CTS frame. Specifically, a terminal having received the CTS frame which is not addressed to the terminal sets an NAV (Network Allocation Vector) for a time period of the length of a value set in the Duration/ID field from the tail end of the frame, and refrains from performing transmission during this time period. This time period is referred to as a transmission prohibition period, or an NAV period. The AP 1 generates the CTS-to-self frame 51, in the Duration/ID field of which, a value corresponding to the length of the duration required for wireless power supply to the BLE terminal 3 is set, and transmits the generated CTS-to-self frame 51. A CTS-to-self frame is an example of transmission prohibition instruction frames, and other frames may be defined and used.

The wireless LAN terminal 2 receives the CTS-to-self frame 51 and sets a transmission prohibition period on the basis of the value set in the Duration/ID field. The wireless LAN terminal 2 refrains from performing any transmission operation in the transmission prohibition period.

By the end of the transmission prohibition period after transmission of the CTS-to-self frame 51, the AP 1 transmits a power supply signal 52 to the BLE terminal 3 thorough the WLAN transmitter 18. The power supply signal is generated using a first parameter.

The BLE terminal 3 receives the power supply signal 52 transmitted from the AP 1. The BLE terminal 3 charges the capacitor on the basis of the power supply signal and measures a power reception amount. The BLE terminal 3 transmits to the AP 1 information (power reception amount information) regarding a measured power reception amount, by BLE. That is, the BLE terminal 3 transmits power reception amount information through the BLE transmitter 34. As described above, power reception amount information may be information indicating the value of a power reception amount, information on whether a power reception amount satisfies a requested value, or other information as long as the information relates to a power reception amount.

The AP 1 receives power reception amount information transmitted from the BLE terminal 3, through the BLE receiver 20. BLE and wireless LAN use different frequency bands. The AP 1 stores in a storage the power reception amount information received from the BLE terminal 3 such that the power reception amount is associated with the first parameter used in generation of the power supply signal 52. The storage may be an internal buffer of the controller. The storage may be a volatile memory such as a SRAM and a DRAM, or may be a non-volatile memory such as a NAND, a MRAM, and a FRAM. Alternatively, the storage may be a hard disk or a storage device such as an SSD.

The AP 1 again acquires an access right to the wireless medium by performing carrier sensing for a waiting time of a fixed duration and a back-off time, and transmits a CTS-to-self frame 54. The wireless LAN terminal 2 receives the CTS-to-self frame 54, and sets a transmission prohibition period according to a value set in the Duration/ID field. In the transmission prohibition period, the AP 1 transmits to the BLE terminal 3 a power supply signal 55 generated using a second parameter. For example, the second parameter is of the same type as the first parameter, but only the item value thereof is changed. For example, if the type of the parameter is an antenna weight, the weight value therefor is changed. If the type of the parameter is a modulation method, the modulation method therefor is changed.

The BLE terminal 3 receives the power supply signal transmitted from the AP 1. The BLE terminal 3 charges the capacitor 5 on the basis of the power supply signal and measures a power reception amount. The BLE terminal 3 transmits information (power reception amount information) regarding a measured power reception amount to the AP 1 by BLE. The AP 1 receives the power reception amount information transmitted from the BLE terminal 3 through the BLE receiver 20. The AP 1 stores in the storage the power reception amount such that the power reception amount is associated with the second parameter.

Thereafter, the same operation is repeated. Accordingly, the AP 1 can acquire information on a highly accurately measured power reception amount for each of the plurality of parameters. The AP 1 determines, on the basis of a plurality of the power reception amount information sets acquired from the BLE terminal 3, a parameter to be applied to the BLE terminal 3. For example, the AP 1 selects a parameter with which a power reception amount becomes the largest. In each of the repeated measurement processes, the length of a power supply period is assumed to be same.

When the measurement process is completed and an ordinary period starts, the AP 1 performs wireless power supply to the BLE terminal 3 by using the determined parameter. For example, the AP 1 intermittently (e.g., at fixed intervals) transmits a power supply signal of a fixed duration or having a fixed length. The AP 1 may check, before performing transmission, the state of the wireless medium by performing carrier sensing, so as to perform transmission if it is determined that the state of the wireless medium is idle. Alternatively, the AP 1 may transmit a power supply signal at a timing scheduled in advance, without performing CSMA/CA processes. The determined parameter may become inappropriate for the BLE terminal 3 depending on change in the in-vehicle environment. For this reason, the AP 1 may perform a parameter updating process by regularly performing the above measurement process. Alternatively, the AP 1 may perform the parameter updating process when a predetermined event is detected. As the predetermined event, the open/closed state of a vehicular window or door may be detected, for example. Other events may be detected.

Second Embodiment

The present embodiment has a characteristic in which, after transmitting a CTS-to-self frame, the AP 1 notifies a measurement period for a power reception amount to the BLE terminal 3 by BLE. During the notified measurement period, the AP 1 transmits a power supply signal. During the notified measurement period, the BLE terminal 3 receives the power supply signal transmitted from the AP 1 and measures a power reception amount. A difference from the first embodiment will be mainly described below.

Figure 4:
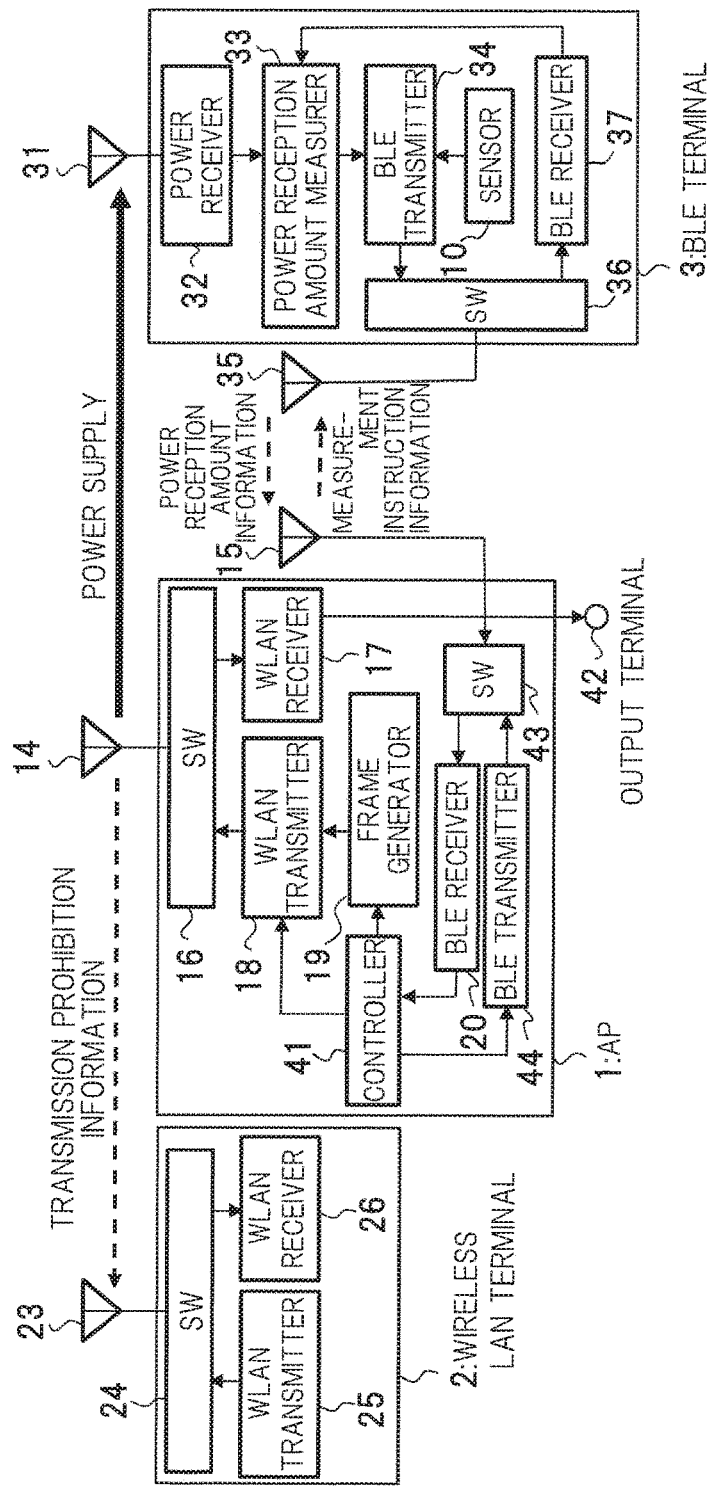
FIG. 4 is a block diagram of a wireless communication system according to a second embodiment.

FIG. 4 is a block diagram of a wireless communication system according to the present embodiment. The present embodiment differs from the first embodiment in that the AP 1 includes a BLE transmitter 44 that performs transmission by BLE and a switch 43. The switch 43 switches a connection destination of the BLE antenna 15 between the BLE receiver 20 and the BLE transmitter 44. The BLE transmitter 44 is connected to the controller 41. In addition, the BLE terminal 3 includes a BLE receiver 37 that performs reception by BLE and a switch 36. The switch 36 switches a connection destination of the BLE antenna 35 between the BLE transmitter 34 and the BLE receiver 37.

The controller 41 of the AP 1 determines a measurement period during which a power reception amount is measured, and supplies to the BLE transmitter 44 measurement instruction information indicating the determined measurement period. The configuration of measurement instruction information is arbitrary. For example, measurement instruction information may include a measurement start time and a length of duration during which measurement is performed. Alternatively, measurement instruction information may include a measurement start time and a measurement end time. Configurations other than those described above may be used. The BLE transmitter 44 transmits measurement instruction information to the BLE terminal 3 through the BLE antenna 15. More specifically, the BLE transmitter 44 transmits a BLE frame which includes the measurement period information and the receiver address of which is the address of the BLE terminal 3. The address of the BLE terminal 3 may be a MAC address, or a differently defined address.

The BLE receiver 37 of the BLE terminal 3 receives the measurement instruction information through the BLE antenna 35, and supplies the measurement instruction information to the power reception amount measurer 33. The power reception amount measurer 33 performs measurement during the measurement period indicated by the measurement instruction information. The power receiver 32 may charge the capacitor on the basis of a received signal also in a time other than the measurement period. Alternatively, the power receiver 32 may be configured to perform charging only during an instructed measurement period in a measurement process.

Figure 5:
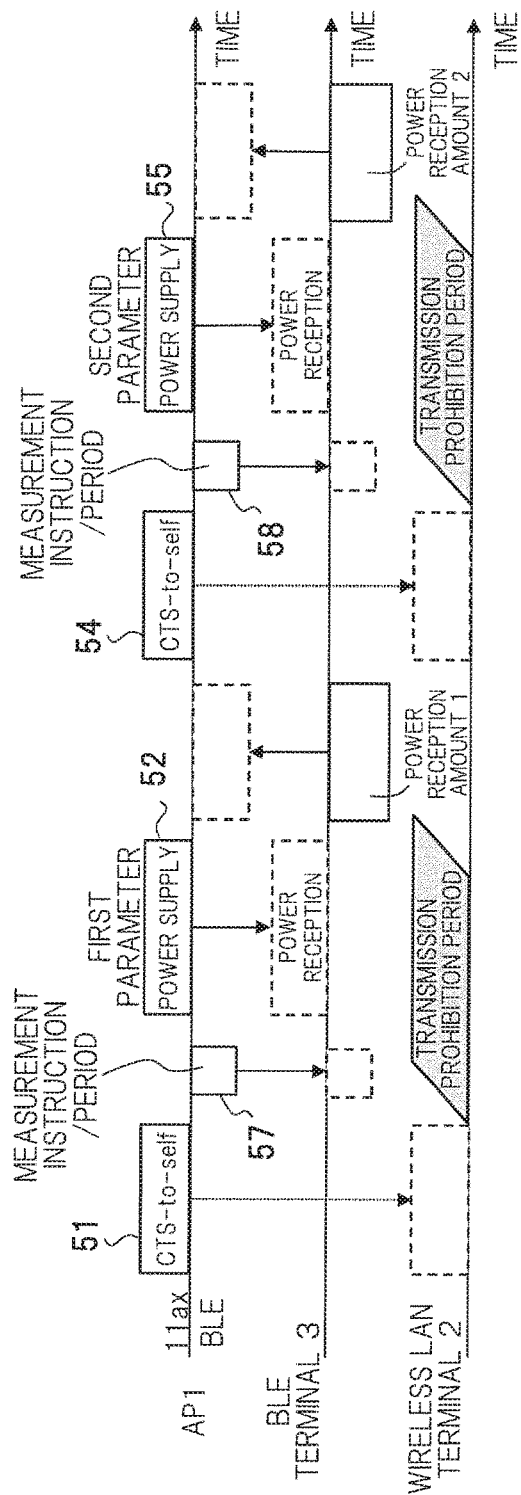
FIG. 5 is a sequence diagram of the wireless communication system in FIG. 4.

FIG. 5 is a sequence diagram of the wireless communication system in FIG. 4. After transmitting the CTS-to-self frame 51, the AP 1 transmits measurement instruction information 57 through the BLE transmitter 44. That is, measurement instruction information is transmitted by BLE. The BLE terminal 3 receives the measurement instruction information 57 through the BLE receiver 37, and supplies the measurement instruction information to the power reception amount measurer 33. The power reception amount measurer 33 specifies a measurement period on the basis of the measurement instruction information 57.

During the measurement period, the AP 1 transmits the power supply signal 52 generated on the basis of a first parameter. The power receiver 32 of the BLE terminal 3 receives the power supply signal 52, and charges the capacitor 5 on the basis of the power supply signal 52. The power reception amount measurer 33 performs measurement only during the specified measurement period, and does not perform measurement in a time period other than the measurement period, even if the power receiver 32 receives a signal. The BLE terminal 3 feeds back measured power reception amount information to the AP 1 through the BLE transmitter 34.

Thereafter, the same process is repeated. That is, the AP 1 again transmits the CTS-to-self frame 54 for wireless LAN, and subsequently, transmits measurement instruction information 58 by BLE. During a measurement period specified by the measurement instruction information 58, the AP 1 transmits the power supply signal 55 generated using a second parameter. The BLE terminal 3 charges the capacitor 5 on the basis of the power supply signal 55 received from the AP 1, measures a power reception amount, and feeds back the power reception amount information by BLE.

As a result of notification of a measurement period to the BLE terminal 3 as described above, the BLE terminal 3 can highly accurately measure a power reception amount. For example, the BLE terminal 3 may receive other signals transmitted from the AP 1 than a power supply signal transmitted from the AP 1. For example, the BLE terminal 3 may receive a CTS-to-self frame transmitted from the AP 1, depending on the position of the BLE terminal 3 or the environment. In this case, the power receiver 32 of the BLE terminal 3 receives the CTS-to-self frame and charges the capacitor 5 with the received power. Accordingly, if a measurement period is not notified, the BLE terminal 3 may measure an amount of power received from the CTS-to-self frame. Therefore, a measurement period is clearly notified to the BLE terminal 3 so that the BLE terminal 3 can measure a power reception amount only in a time during which the AP 1 actually transmits a power supply signal. In this way, the AP 1 can highly accurately grasp the power reception amount of the BLE terminal 3.

Third Embodiment

The present embodiment has a characteristic in which the AP 1 includes a plurality of antennas and weights for the antennas are controlled as power supply parameters. A difference from the second embodiment will be mainly described below.

Figure 6:
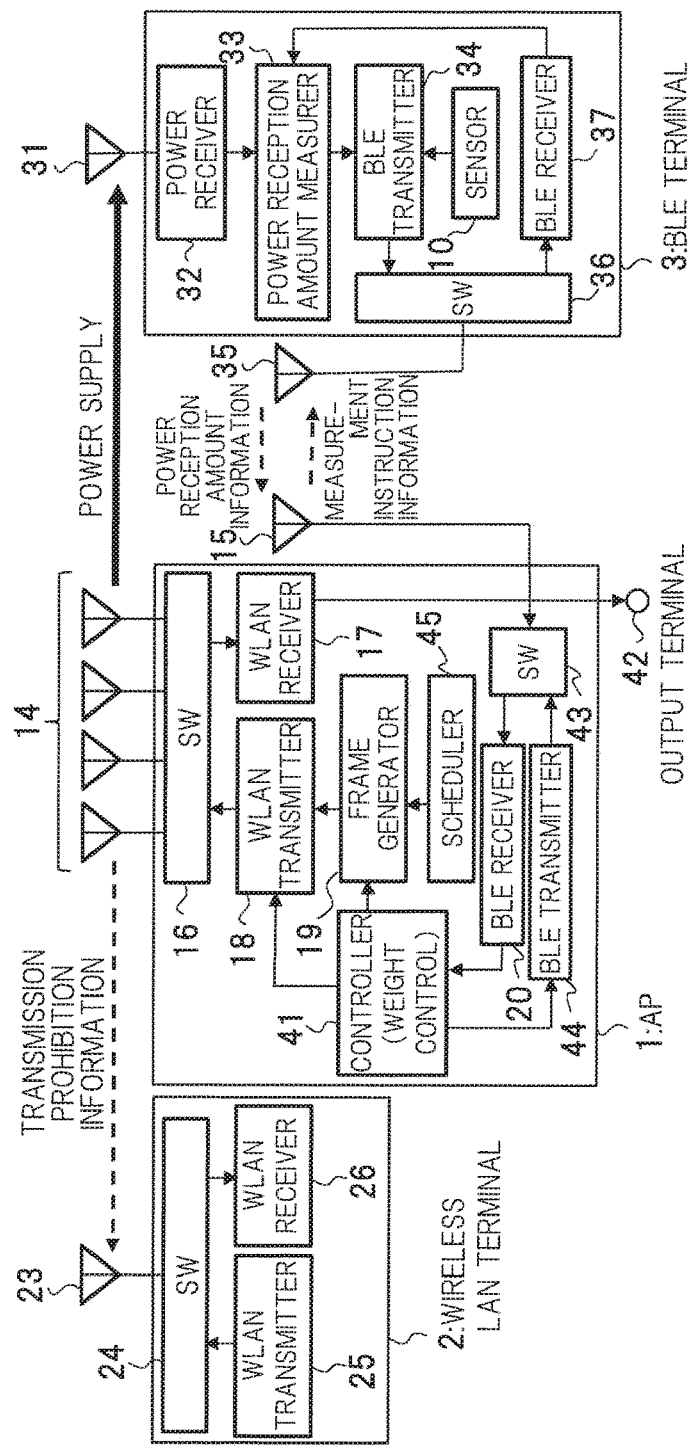
FIG. 6 is a block diagram of a wireless communication system according to a third embodiment.

FIG. 6 is a block diagram of a wireless communication system according to the present embodiment. The present embodiment differs from the second embodiment in that the AP 1 includes a plurality of the antennas 14 and the controller 41 controls weights for the antennas as power supply parameters. In addition, the AP 1 includes a scheduler 45. The scheduler 45 schedules data transmission with the wireless LAN terminal 2, measurement of a power reception amount of the BLE terminal 3, and power supply in an ordinary period, etc.

The controller 41 controls weights for the antennas 14. Here, a weight means an adjustment value with respect to an amplitude and a phase. As a result of adjustment of the amplitude and phase of a transmitted signal for each antenna, various beams can be formed. As a result of forming a beam appropriate for the BLE terminal 3, power supply signals having high transmission efficiency can be transmitted. Transmission efficiency means the ratio of received power to transmitted power. In most cases, which weight to be set for each antenna in order to form an optimum beam (a beam having high transmission efficiency) for the BLE terminal 3 is unknown in advance. Accordingly, power supply signals are transmitted by various weights as power supply parameters and feedbacks of power reception amount information are received, and thereby, a weight appropriate for the BLE terminal 3 is determined. A parameter indicating combination of weights to be set for the respective antennas is referred to as a weight parameter.

Figure 7:
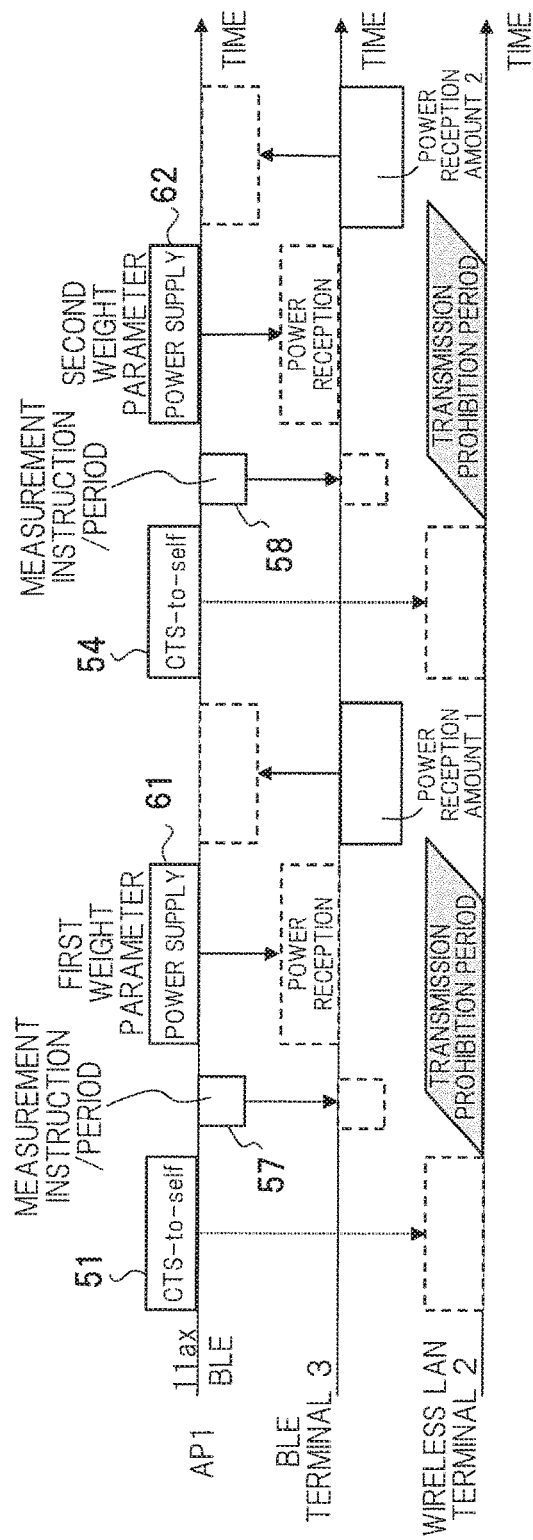
FIG. 7 is a sequence diagram of the wireless communication system in FIG. 6.

FIG. 7 is a sequence diagram of the wireless communication system in FIG. 6. The sequence in FIG. 7 differs from that in FIG. 5 according to the second embodiment in that weights for the antennas are controlled as power supply parameters for generating power supply signals. The other operations are identical to those in FIG. 5, and thus, the explanation thereof is omitted.

FIG. 8 shows a result obtained by measuring power reception amounts K times while changing weight parameters. In FIG. 8, for first to K-th weight parameters, the values of power reception amounts fed back from the BLE terminal 3 are shown. This example assumes that with a second weight parameter, the transmission efficiency becomes the highest. In this case, for example, the controller 41 selects the second weight parameter, and wireless power supply to the BLE terminal 3 is performed using the second weight parameter in an ordinary period following completion of a measurement process.

Figure 9:
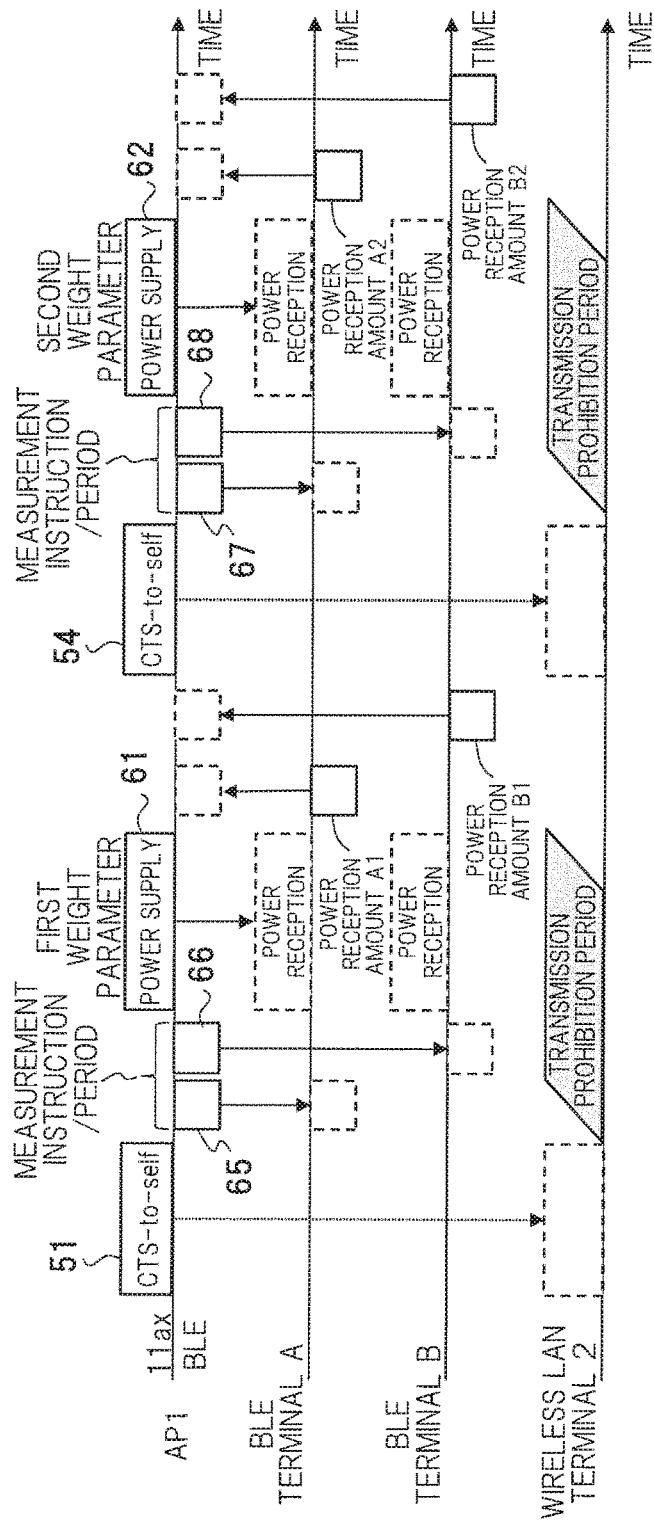
FIG. 9 is another sequence example of the wireless communication system in FIG. 6.

FIG. 9 shows another sequence example of the wireless communication system in FIG. 4. In this sequence example, two BLE terminals 3 (referred to as "BLE terminal A" and "BLE terminal B") are shown. Weights for the antennas are controlled as power supply parameters, as in the sequence in FIG. 7.

After transmitting the CTS-to-self frame 51, the AP 1 transmits, to the BLE terminal A by BLE, measurement instruction information 65 for specifying a certain measurement period, and subsequently, transmits, to the BLE terminal B by BLE, measurement instruction information 66 for specifying the measurement period same as that transmitted to the BLE terminal A. The AP 1 generates a power supply signal 61 by using a first weight parameter, and transmits the power supply signal 61 via an operation channel of the wireless LAN during the specified measurement period. FIG. 10 schematically illustrates a case where wireless power supply is simultaneously performed to the BLE terminal A and the BLE terminal B by using the first weight parameter. The BLE terminal A and the BLE terminal B each charge the capacitor 5 on the basis of the power supply signal received from the AP 1, and each measure a power reception amount during the measurement period. After the end of the measurement period, the BLE terminal A feeds back power reception amount information A1 to the AP 1 by BLE, and the BLE terminal B feeds back power reception amount information B1 by BLE. Respective feedback timings for the BLE terminal A and the BLE terminal B may be specified by the AP 1 using the measurement instruction information 65 and the measurement instruction information 66, or the BLE terminal A and the BLE terminal B may perform feedbacks at respective arbitrary timings in a period specified in advance.

Thereafter, the same process is repeated. That is, the AP 1 again transmits the CTS-to-self frame 54 for the wireless LAN, and transmits measurement instruction information 67, 68 by BLE sequentially to the BLE terminal A and the BLE terminal B, respectively. The AP 1 converts the weight parameter into a second weight parameter. During the measurement period specified by the measurement instruction information, the AP 1 transmits a power supply signal 62 generated using the converted second weight parameter, via a channel of the wireless LAN. The BLE terminal A and the BLE terminal B each charge the capacitor 5 on the basis of the power supply signal 62 received from the AP 1, measure a power reception amount, and sequentially feed back power reception amount information A2, B2, by BLE.

As described above, instructions for measuring power reception amounts are given to a plurality of terminals (the BLE terminal A and the BLE terminal B) and feedbacks are received, and thereby, a weight parameter for allowing simultaneous power supply to the plurality of terminals can be obtained. The controller 41 specifies a weight parameter satisfying both the values requested from the BLE terminal A and the BLE terminal B, so that wireless power supply to the BLE terminal A and the BLE terminal B can be simultaneously performed using the specified weight parameter. Accordingly, efficient power supply can be performed. The AP 1 acquires values requested from the BLE terminals through BLE communication in advance. For example, a requested value may be a power reception amount per fixed time period or a power reception amount per one power supply, or one defined in a different way.

FIG. 11 shows examples of selecting weight parameters common for a plurality of the BLE terminals 3. Three BLE terminals A, B, and C are shown. The upper table (a charge amount table) in FIG. 11 shows power reception amounts fed back from the BLE terminals A to C by sequentially executing the first to third weight parameters. The "current consumption" represents current consumption of each of the BLE terminals, and is a predetermined value. For example, for the first weight parameter, the power reception amount fed back from the BLE terminal A is $7\times10^{-9}$ [µAh], the power reception amount fed back from the BLE terminal B is $3\times10^{-9}$ [µAh], and the power reception amount fed back from the BLE terminal C is $4\times10^{-9}$ [µAh].

An operable time of a BLE terminal can be calculated by dividing a power reception amount by a consumption current. The calculation result is shown in the lower table (an operation time table) in FIG. 11. For example, for the first weight parameter, the operable time of the BLE terminal A is $3.5\times10^{-9}$ [h], the operable time of the BLE terminal B is $0.3\times10^{-9}$ [h], and the operable time of the BLE terminal C is $0.25\times10^{-9}$ [h]. For the second and third weight parameters, the operable times are calculated in the same manner. The lowest line in the operation time table shows an operation time (a shortest operable time) which is the shortest for each weight parameter. For example, for the first weight parameter, the operable time $0.25\times10^{-9}$ [h] of the BLE terminal C is shown because this time is the shortest. The AP 1 selects one weight parameter on the basis of the shortest operable times for the first to third weight parameters. For example, the AP 1 selects a weight parameter the shortest operable time for which is the longest. In this example, the second weight parameter is selected. As a result of using the second weight parameter, simultaneous wireless power supply can be performed such that one power supply operation to the BLE terminals A to C allow the BLE terminals A to C to operate for $1.0\times10^{-9}$ [h], $0.5\times10^{-9}$ [h], and $1.0\times10^{-9}$ [h], respectively. In this case, a power supply cycle for an ordinary operation time may be set to the shortest time $0.5\times10^{-9}$ [h] or shorter. The power supply cycle having the shortest time corresponds to the shortest cycle of wireless power supply. If the shortest requested value from the BLE terminal B is $0.2\times10^{-9}$ [h], the third weight parameter does not satisfy the requested value, and thus, the third parameter is excluded from targets to be selected.

In a case where wireless power supply is performed independently by using a weight parameter independently selected for each BLE terminal, an optimum weight parameter may be selected for each BLE terminal. For example, in the BLE terminal A, the operable time becomes the longest for the first weight parameter, and thus, the first weight parameter is selected. In the BLE terminal B, the operable time becomes the longest for the second weight parameter, and thus, the second weight parameter is selected. In the BLE terminal C, the operable time becomes the longest for the third weight parameter, and thus, the third weight parameter is selected. In this case, a power supply cycle in an ordinary operation time following the measurement process may be independently set for each BLE terminal so as to be equal to or shorter than the operable time for the corresponding BLE terminals. In this case, the shortest power supply cycles for the respective terminals are different from one another. Alternatively, a common power supply cycle may be set for the BLE terminals such that the cycle is equal to or shorter than the operable time which is the shortest among those of the BLE terminals.

The power supply cycles for the BLE terminals 3 may be determined by considering a data transmission delay request to the wireless LAN terminal 2. An example is shown in which the scheduler 45 performs scheduling of wireless power supply and data transmission in an ordinary period following a measurement process. FIGS. 12A and 12B show the scheduling examples. In the examples, scheduling is performed for one wireless LAN terminal 2 and one BLE terminal 3. However, the scheduling can be also performed in a case where the number of the wireless LAN terminals 2 and/or the BLE terminals 3 is two or more.

In FIGS. 12A and 12B, "T [s]" represents the shortest wireless power supply cycle for the BLE terminal 3 and "$D_0$ [s]" represents a data transmission delay request to the wireless LAN terminal 2.

FIG. 12A shows a scheduling example in which $T<D_0$. The data transmission cycle corresponds to the shortest power supply cycle. That is, both of the power supply cycle and the data transmission cycle are identical to the shortest wireless power supply cycle. FIG. 12B shows a scheduling example in which $T>=D_0$. The power supply cycle is identical to a shortest cycle T. The data transmission cycle is identical to the value "D" ($=T/k$) obtained by dividing the shortest wireless power supply cycle by "k" (an arbitrary value greater than 1, e.g., an integer equal to or greater than 2). The value "k" is determined such that a condition in which the value "D" is less than "$D_0$" is satisfied. As a result of determining the data transmission cycle in this way, synchronization between data transmission and power supply can be easily achieved, and thus, scheduling becomes easier.

Figure 13:
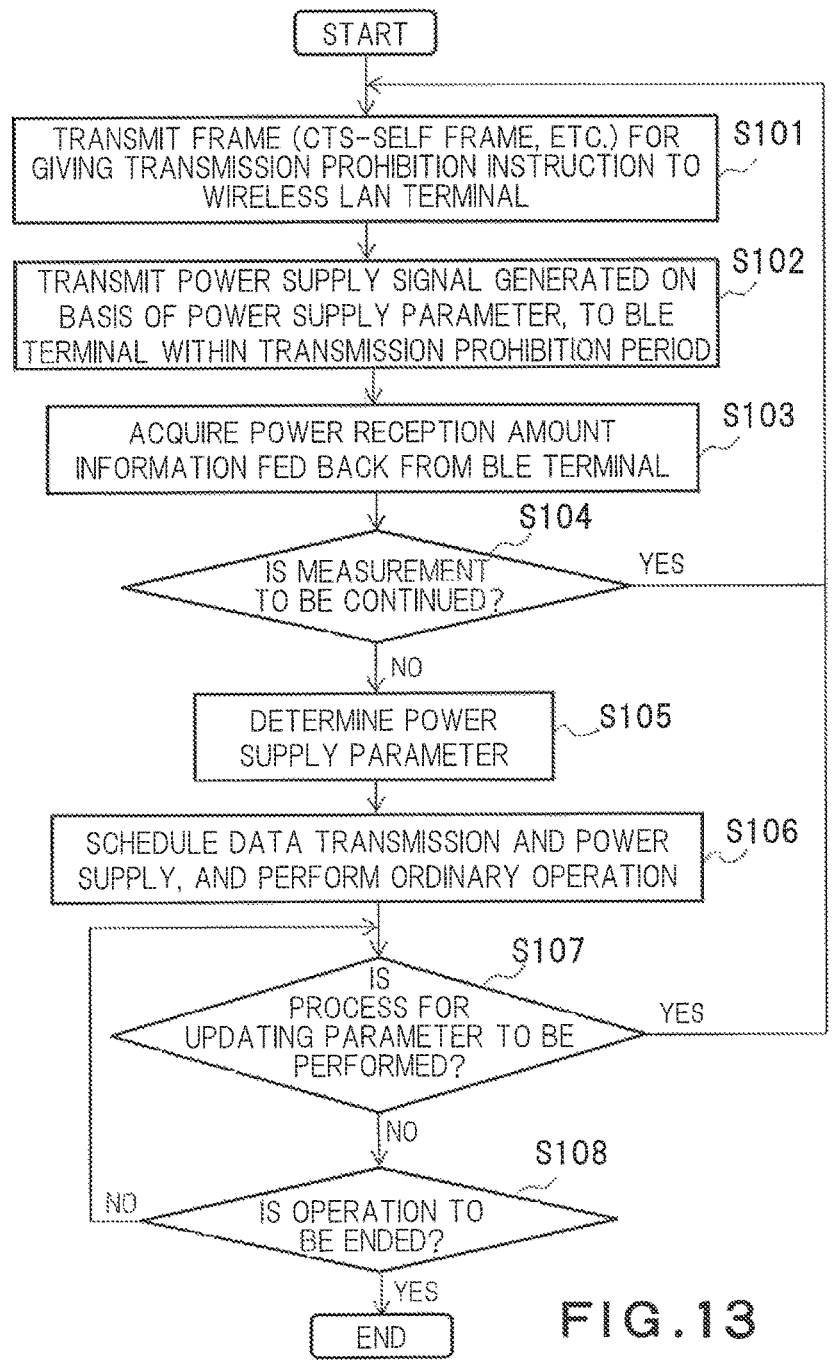
FIG. 13 is a flowchart of an operation example of an access point.

FIG. 13 is a flowchart of an operation example of the AP 1 according to the present embodiment. The AP 1 transmits a transmission prohibition instruction frame (here, a CTS-to-self frame) to the wireless LAN terminal 2 (S101). Within a transmission prohibition period specified by the CTS-to-self frame, the AP 1 transmits, to a BLE terminal, a power supply signal generated on the basis of a power supply parameter (S102). The power supply parameter may be a weight parameter, or a parameter of another type. The AP 1 acquires power reception amount information based on a power reception amount measured by the BLE terminal (S103). The AP 1 determines whether to continue the measurement process (S104). When the measurement process is determined to be continued, the flow returns to step S101. When the measurement process is determined not to be continued, the flow proceeds to nest step S105. Regarding a criterion for determining whether to continue the measurement process, for example, when measurement has been performed a predetermined number of times, the measurement process may be determined not to be continued. Alternatively, when a request for ending the measurement is received from the BLE terminal, the measurement process may be determined not to be continued. When measurement has been performed with power supply parameters of all predetermined patterns, the measurement process may be determined not to be continued. Alternatively, when determination information indicating that a measured power reception amount satisfying a value required by the BLE terminal is received, the measurement process may be determined not to be continued.

At step S105, a power supply parameter to be used is determined on the basis of power reception amount information acquired for each of a plurality of power supply parameters. Subsequently, the AP 1 schedules data transmission from the wireless LAN terminal 2 and power supply to the BLE terminal during an ordinary period, and the like (S106). Thereafter, the AP 1 operates in accordance with the result of the scheduling. The AP 1 determines whether to perform a process for updating the power supply parameter (S107). For example, when a predetermined time has been elapsed since the last update of the power supply parameter, or when an update is requested by the BLE terminal, an update process may be determined to be performed. When the AP 1 determines to perform an update process, the flow returns to step S101. When the AP 1 determines not to perform an update process, the AP 1 determines whether to end the operation (S108). For example, when stop of a vehicle engine is detected, the operation may be determined to be ended. Alternatively, when an operation stop instruction is received from a user of the automobile, the operation may be determined to be ended. When the operation is determined not to be ended, the flow returns to step S107. When the operation is determined to be ended, the flow is ended.

Between step S101 and step S102 in the above flow, a step of transmitting measurement instruction information specifying a measurement period to the BLE terminal may be executed. The above flow may be performed for one BLE terminal, or may be performed for a plurality of BLE terminals. When the flow is performed for a plurality of BLE terminals, power supply signals may be independently and sequentially transmitted to cause the BLE terminals to measure power reception amounts, or common power supply signals may be transmitted to cause the BLE terminals to simultaneously measure power reception amounts.

Fourth Embodiment

Depending on a radio wave environment and the positional relationship among the wireless LAN terminal 2, the AP 1, and the BLE terminal 3, a signal of data transmission between the AP 1 and the wireless LAN terminal 2 is also received by the BLE terminal 3. The present embodiment has a characteristic in which not only a power reception amount as a result of a power supply signal, but also a power reception amount as a result of a signal of data transmission between the wireless LAN terminal 2 and the AP 1 is measured and fed back to the AP 1. A power supply parameter (a weight parameter) for the BLE terminal 3 is determined on the basis of the total power reception amount obtained by adding the power reception amount as a result of a power supply signal and the power reception amount as a result of a data transmission signal. A difference from the third embodiment will be mainly described below.

A block diagram of the wireless communication system according to the present embodiment is FIG. 6 as in the third embodiment.

Figure 14:
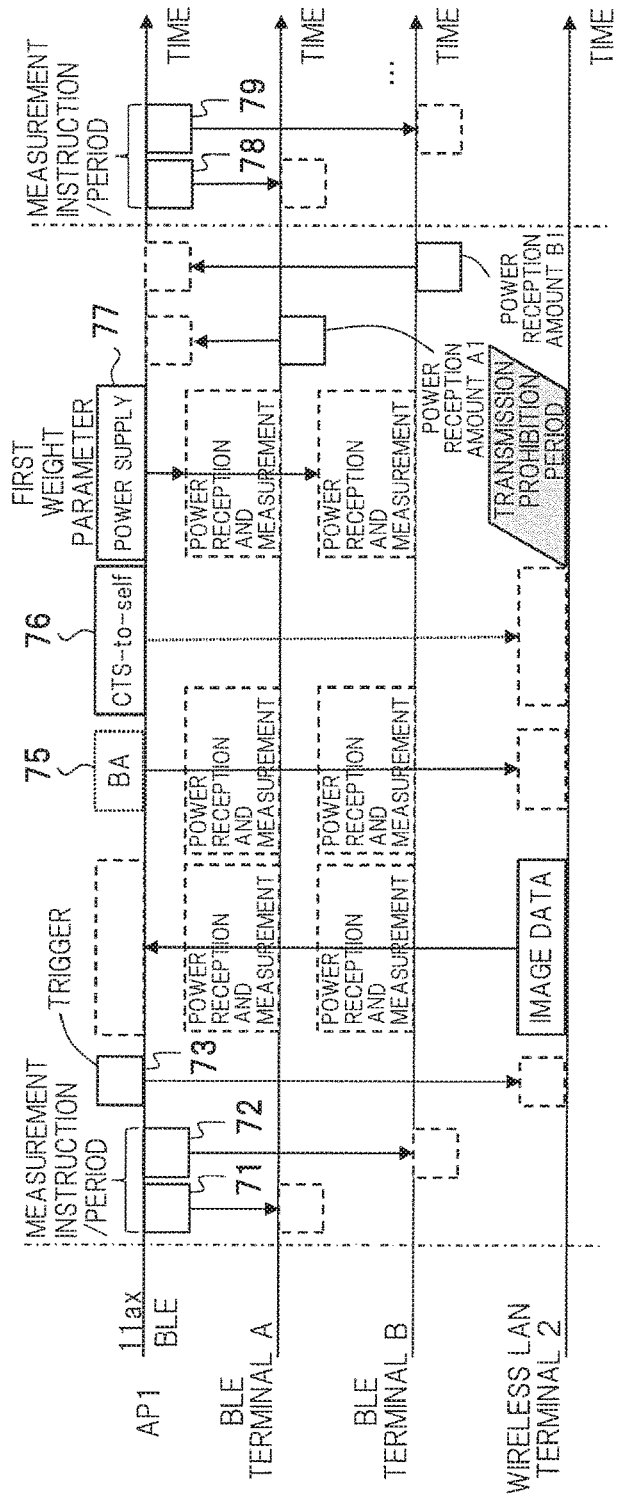
FIG. 14 shows a sequence example of a wireless communication system according to a fourth embodiment.

FIG. 14 is a sequence example of the wireless communication system according to the present embodiment. In the drawing, two BLE terminals 3 are shown and denoted by the BLE terminal A and the BLE terminal B respectively. As in the sequence in FIG. 9, weights for the antennas are controlled as power supply parameters.

The AP 1 sequentially transmits measurement instruction information 71 and 72 indicating measurement periods, to the BLE terminal A and the BLE terminal B, respectively, by BLE. Here, as the measurement periods, a period of data transmission between the AP 1 and the wireless LAN terminal 2 and a period of wireless power supply for measurement are specified. For example, the data transmission period is a period from a timing at which the AP 1 starts to receive data from the wireless LAN terminal 2 to a timing at which transmission of an acknowledgement response to the data is completed. A period for transmitting a CTS-to-self frame 76 which is to be transmitted after transmission of the acknowledgement response, is not included in the measurement period. The reason for this is that if a period for measuring received power includes the period for transmitting the CTS-to-self frame 76, accurate scheduling or accurate measurement becomes difficult because transmission of a CTS-frame is not expected in an ordinary operation following a measurement process.

Here, it is assumed that the wireless LAN terminal 2 is a camera and the AP 1 receives image data from the wireless LAN terminal 2. Data to be transmitted from the wireless LAN terminal 2 is transmitted in a form of a wireless LAN data frame. A data frame may be an aggregation frame defined by IEEE802.11 standard. An aggregation frame is a frame formed of a plurality of aggregated sub frames. In this case, each sub frame stores therein image data. As a frame of an acknowledgement response to an aggregation frame, a BA frame may be used. A BA frame notifies, at a time, success/failure of reception of the sub frames by bitmap. As a frame of an acknowledgement response to an ordinary data frame, an ACK frame may be used. The present embodiment assumes a case where the wireless LAN terminal 2 transmits an aggregation frame and the AP 1 returns a BA frame as an acknowledgement response.

After transmitting the measurement instruction information 71, 72, the AP 1 transmits, via the wireless LAN, a frame 73 for instructing the wireless LAN terminal 2 to transmit uplink data. Uplink transmission means transmission from the wireless LAN terminal 2 to the AP 1, and downlink transmission means transmission from the AP 1 to the wireless LAN terminal 2. As a frame for giving an instruction of uplink transmission, a frame defined by IEEE802.11ax can be used. In the present embodiment, such a frame is referred to as a trigger frame. A trigger frame specifies information for specifying a terminal to which uplink transmission is allowed, a size (which may be a packet size) of data to be uplink-transmitted, and the like. In addition, a trigger frame may specify a timing of uplink transmission. Before transmitting the trigger frame 73, the AP 1 acquires an access right to the wireless medium in accordance with CSMA/CA.

Here, the receiver address of the trigger frame may be the address of the wireless LAN terminal 2, or may be a broadcast address or a multicast address. When the receiver address is a broadcast address or a multicast address, information for specifying the wireless LAN terminal 2 is included in the header or frame body field. The transmitter address of the trigger frame is the address of the AP 91. The transmitter address may be omitted. The form of the trigger frame is not limited to a particular form. The fact that a frame is a trigger frame may be indicated by Type and Subtype of the frame control field of a MAC header. In IEEE802.11 standard, various types of frames can be defined by using Type and Subtype.

When the wireless LAN terminal 2 receives the trigger frame 73 transmitted from the AP 1, the wireless LAN terminal 2 generates a data frame 74 including image data, in accordance with information specified by the trigger frame 73, and transmits the data frame 74. For example, the data frame 74 is transmitted after elapse of a predetermined time since completion of reception of the trigger frame 73. When a timing for uplink transmission is specified by the trigger frame 73, the data frame 74 may be transmitted at the specified timing. The start timing of the transmission corresponds to a timing for the BLE terminal A and the BLE terminal B to start measurement.

Figure 15:
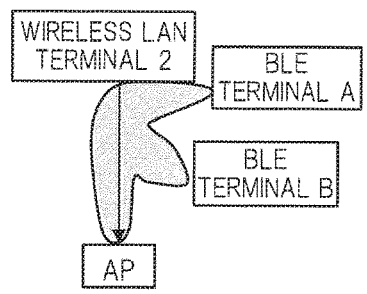
FIG. 15 illustrates a case where a data frame signal transmitted from a wireless LAN (Local Area Network) terminal is received by a plurality of BLE terminals A and B.

The signal of the data frame 74 is also received by the BLE terminal A and the BLE terminal B. FIG. 15 illustrates this case. The BLE terminal A and the BLE terminal B each measure a power reception amount based on the signal. The AP 1 receives the data frame 74 transmitted from the wireless LAN terminal 2, and checks success/failure of reception of sub frames included in the data frame. After elapse of a fixed duration since completion of reception of the data frame 74, the AP 1 transmits a BA frame 75 that stores therein the check results of the respective sub frames. The transmission period of the BA frame 75 is also included in the measurement period for the BLE terminal A and the BLE terminal B. The BLE terminal A and the BLE terminal B each measure a power reception amount on the basis of the signal of the BA frame 75.

After transmitting the BA frame 75, the AP 1 transmits a CTS-to-self frame 76 in order to set a transmission prohibition period. Within the transmission period, the AP 1 transmits a power supply signal 77 generated using the first weight parameter, via the wireless LAN. A period for performing wireless power supply is made to be identical to the measurement period specified for the BLE terminal A and the BLE terminal B. The BLE terminal A and the BLE terminal B each measure a power reception amount on the basis of the power supply signal 77. The BLE terminal A and the BLE terminal B each feed back, to the AP 1 by BLE, power reception amount information A1 including the total of the power reception amount of the data transmission period and the power reception amount of the power supply period.

Thereafter, the aforementioned process from transmission of measurement instruction information to feedback of power reception amount information is repeated as one cycle while the weight parameter is changed. The AP 1 specifies a common weight parameter for the BLE terminal A and the BLE terminal B on the basis of the measurement result, as in the third embodiment. As a result of using the specified parameter, simultaneous wireless power supply can be performed while requested values from the BLE terminal A and the BLE terminal B are satisfied. Accordingly, efficient power supply can be performed.

According to the present embodiment, since a data transmission period between the AP 1 and the wireless LAN terminal 2 is also included in a measurement period, a weight parameter can be obtained considering power reception of the data transmission period. For example, even when power supply using a certain weight parameter is performed only during a power supply period, requests from the BLE terminal A and the BLE terminal B may not be satisfied. However, the requests may be satisfied by adding power reception of a data transmission period. Therefore, even when the number of the BLE terminals 3 is increased, the possibility of specifying a weight parameter capable of simultaneously satisfying the requests from the BLE terminals 3 can be increased. In addition, scheduling of wireless power supply to a plurality of the BLE terminals 3 (e.g., adjustment of the length of a power supply period) can be performed by considering even power reception of a data transmission period.

In the sequence example in FIG. 14, the total of the power reception amount of the data transmission period and the power reception amount of the power supply period is measured. However, the amounts may be separately measured and fed back to the AP 1. In this case, at a timing at which the transmission period of the BA frame 75 is completed, the BLE terminal A and the BLE terminal B may feed back to the AP 1, information on power reception amounts measured so far. Information on a power reception amount measured during the power supply period may be separately fed back to the AP 1. As a result of separately measuring power reception amounts of a data transmission period and a power supply period, flexibility in scheduling can be improved. In addition, the probability of obtaining a more appropriate weight parameter can be increased.

Fifth Embodiment

The present embodiment has a characteristic in which energy required for operating the BLE terminal 3 is supplied as soon as possible after start of the AP 1 (e.g., after start of an engine of an automobile).

Any of the block diagrams according to the first to fourth embodiments can be applied as a block diagram according to the present embodiment. Here, for convenience, the block diagram according to the fourth embodiment (see FIG. 6) is used.

In the present embodiment, the AP 1 has, as a transmission mode for beacon frames, a first mode in which a beacon frame (a long beacon frame) having a first length is periodically transmitted, and a second mode in which a beacon frame having a second length which is shorter than the first length is periodically transmitted. The first mode is executed at a time of start of the AP 1, and the second mode is executed after completion of the first mode. A beacon frame having the second length is an ordinary beacon frame. A long beacon frame can be generated by adding dummy data to the tail of an ordinary beacon frame. The frame generator 19 generates a long beacon frame in the first mode, and generates an ordinary beacon frame in the second mode. The AP 1 executes the first mode at a time of start, and shifts, when a predetermined condition is satisfied, to the second mode. Switching of the modes is controlled by the controller 41 or the scheduler 45, for example.

Figure 16:
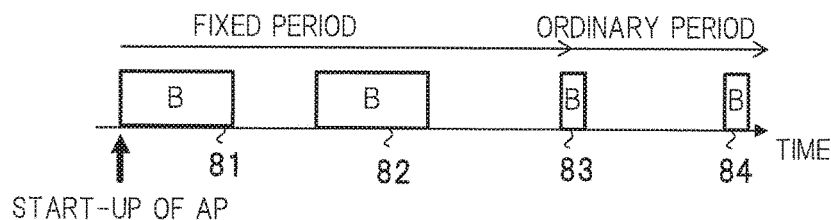
FIG. 16 shows a sequence example according to a fifth embodiment.

FIG. 16 shows a sequence example according to the present embodiment. In this example, the predetermined condition is elapse of a fixed period (a fixed duration) since start of the AP 1. When the AP 1 is started, the first mode is executed for the fixed duration. In the first mode, long beacon frames 81, 82 are transmitted at fixed intervals. When the fixed duration has elapsed, the transmission mode is shifted to the second mode and the second mode is executed. A period during which the second mode is executed corresponds to an ordinary period of the AP 1. In the second mode, ordinary beacon frames 83, 84 are transmitted at fixed intervals. At start of the AP 1, since no or a small amount of charge is stored in the capacitor of the BLE terminal 3, the BLE terminal 3 cannot perform an ordinary operation (a sensing operation, etc.). Therefore, at start of the AP 1, the long beacon frames 81, 82 are transmitted. The BLE terminal 3 receives the signals of the long beacon frames 81, 82 to charge the capacitor. Accordingly, the BLE terminal 3 can quickly store necessary energy in the capacitor.

Figure 17:
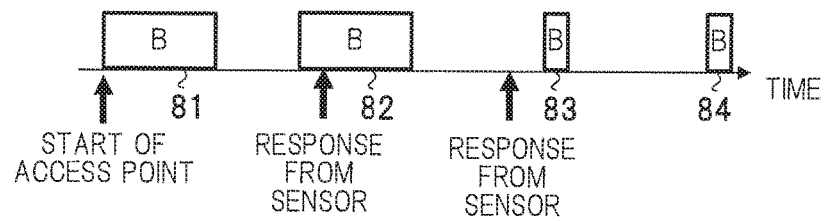
FIG. 17 shows another sequence example according to the fifth embodiment.

FIG. 17 shows another sequence example according to the present embodiment. In this example, the predetermined condition is reception of a response indicating that charge necessary for the capacitor has been stored from each of the BLE terminals to the AP 1. When the predetermined condition is satisfied, the transmission mode is shifted to the second mode. At start of the AP 1, the AP 1 executes the first mode as the transmission mode for beacon frames. In the first mode, the long beacon frames 81, 82 are transmitted at fixed intervals. A BLE terminal, which is connected to the AP 1 by BLE, charges the capacitor by using the signals of the long beacon frames 81, 82 transmitted from the AP 1. When charge required for operations has been stored, the BLE terminal transmits a response (an initial charging completion response) indicating that charging is completed, to the AP 1 by BLE. When the AP 1 has received the initial charging completion responses from all the BLE terminals, a beacon frame to be transmitted thereafter is changed to an ordinary beacon frame. That is, the transmission mode for beacon frames is shifted to the second mode. In the second mode, the ordinary beacon frames 83, 84 are transmitted at fixed intervals. In the present example, immediately after reception of responses from the two BLE terminals connected to the AP 1, transmission of ordinary beacon frames is restored.

Sixth Embodiment

The present embodiment also has a characteristic in which wireless power supply required for operating the BLE terminal 3 is performed as soon as possible after start of the AP 1 (e.g., after start of an engine of an automobile), as in the fifth embodiment.

Any of the block diagrams according to the first to fourth embodiments can be applied as a block diagram according to the present embodiment. Here, for convenience, the block diagram according to the fourth embodiment (see FIG. 6) is used.

Figure 18:
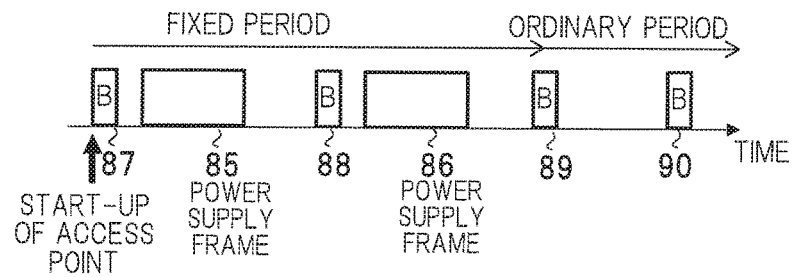
FIG. 18 shows a sequence example according to a sixth embodiment.

FIG. 18 shows a sequence diagram according to the present embodiment. For a fixed period after start of the AP 1, the AP 1 intermittently transmits power supply frames 85, 86 in compliance with the wireless LAN standard. After elapse of the fixed period, the AP 1 enters an ordinary period and stops to transmit a power supply frame. In both of the fixed period after the start and the ordinary start, periodically transmitted beacon frames 87, 88, 89, 90 have the same lengths. However, a beacon frame having a longer length may be transmitted for the fixed period after the start, as in the fifth embodiment. As a result of transmitting power supply frames for a fixed period after start of the AP 1, in this way, energy necessary for the BLE terminal 3 can be quickly supplied at the start, as in the fifth embodiment.

Here, the configuration of each power supply frame is not limited to a particular configuration. For example, the receiver address (RA) of the power supply frame may be the address (BSSID) of the AP 1. In this case, the power supply frame is a dummy frame, and other BLE terminals 3 regard the power supply frame as a frame not addressed to the BLE terminals 3, and discard the power supply frame. The power supply frame may be periodically transmitted. In the example in FIG. 18, after elapse of a fixed duration since completion of transmission of the beacon frames 87, 88, the dummy frames (power supply frames) 85, 86 are transmitted.

Seventh Embodiment

In the first to sixth embodiments, the wireless communication systems each including the AP 1, the wireless LAN terminal 2, and the BLE terminal 3 have been described. In the present embodiment, a wireless communication system including an AP 91 and a wireless LAN terminal 92 but lacking a BLE terminal will be described. In the present system, the AP 91 supplies power to the wireless LAN terminal 92. The wireless LAN terminal 92 measures a power reception amount, and feeds back the power reception amount information to the AP 91. In this case, the present embodiment has a characteristic in which the wireless LAN terminal 92 can highly accurately measure a power reception amount.

Figure 19:
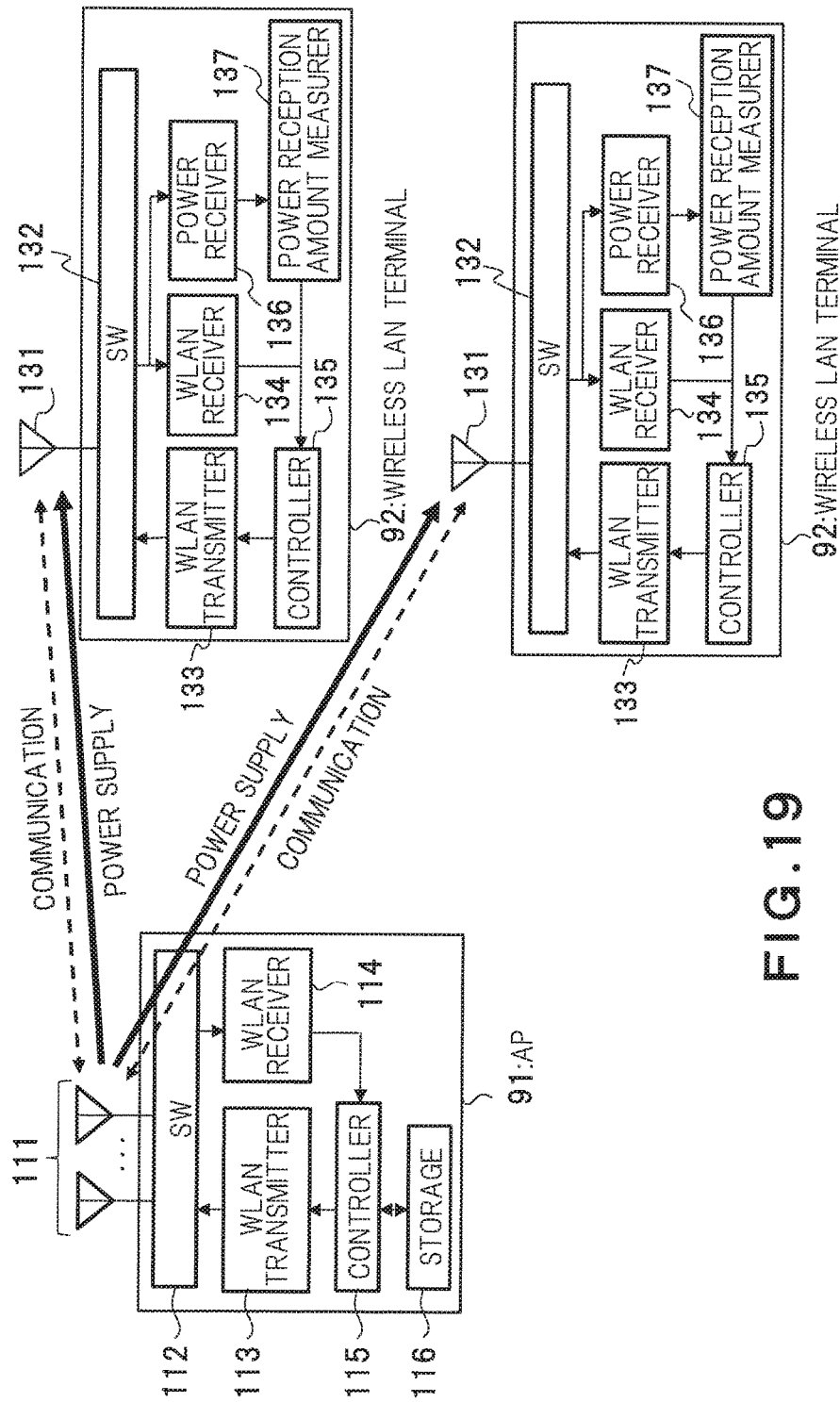
FIG. 19 is a block diagram of a wireless communication system according to a seventh embodiment.

FIG. 19 is a block diagram of the wireless communication system according to the present embodiment. The wireless communication system in FIG. 19 includes the AP 91 and a plurality of the wireless LAN terminals 92.

The AP 91 includes one or more antennas 111, a switch 112, a WLAN transmitter 113, a WLAN receiver 114, a controller 115, and a storage 116. The switch 112, the WLAN transmitter 113, and the WLAN receiver 114 are similar to the switch 16, the WLAN transmitter 18, and the WLAN receiver 17 included in the AP 1 in FIG. 2, respectively. The controller 115 has functions identical to those of the frame generator 19 and the controller 41 included in the AP 1 in FIG. 2. The storage 116 holds information required for operating the controller 115, information and data received from the wireless LAN terminal 92, and the like. The storage may further include the AP 1 in FIG. 2.

Each of the wireless LAN terminals 92 includes an antenna 131, a switch 132, a WLAN transmitter 133, a WLAN receiver 134, a controller 135, a power receiver 136, and a power reception amount measurer 137. Each of the wireless LAN terminals 92 may include a plurality of the antennas 131. The WLAN transmitter 133 and the WLAN receiver 134 have functions identical to those of the LAN transmitter 25 and the WLAN receiver 26 included in the wireless LAN terminal 2 in FIG. 2, respectively. The power receiver 136 and the power reception amount measurer 137 have functions identical to those of the power receiver 32 and the power reception amount measurer 33 included in the BLE terminal 3 in FIG. 2, respectively. The wireless LAN terminals 92 each operate using, as energy, charge stored in a capacitor included in the power receiver 136. Similarly to the BLE terminal 3 in FIG. 2, the wireless LAN terminal 92 may include the sensor 10.

Figure 20:
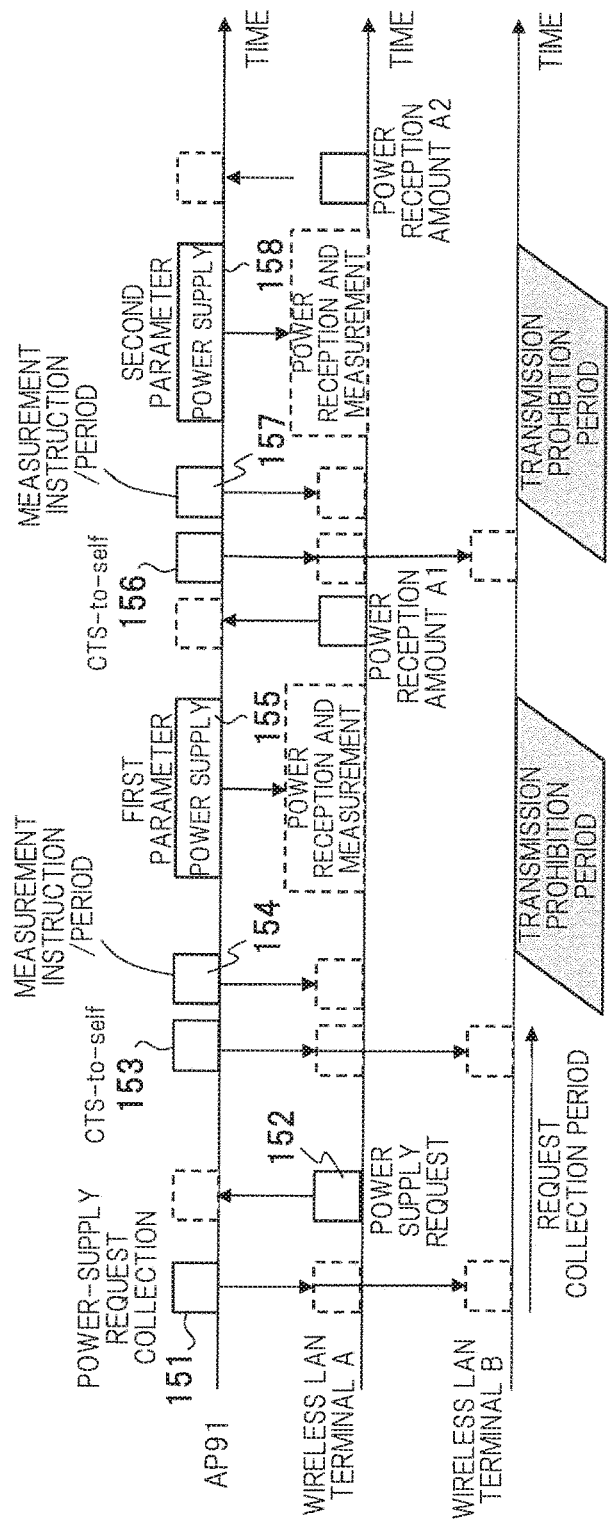
FIG. 20 is a sequence diagram of the wireless communication system in FIG. 19.

FIG. 20 is a sequence diagram of the wireless communication system in FIG. 19. Operations of the AP 91 and two of the wireless LAN terminals 92 (represented by a wireless LAN terminal A and a wireless LAN terminal B in the drawing) are shown along respective time axes. The outline of the present sequence is as follows. First, the AP 91 inquires of each of the wireless LAN terminals A, B about the presence/absence of a power supply request. The AP 91 transmits measurement instruction information to a wireless LAN terminal which has transmitted a notification of the presence of a power supply request. Next, the AP 91 transmits a power supply signal generated on the basis of a power supply parameter to the wireless LAN terminal and acquires power reception amount information. Thereafter, the AP 91 repeats transmission of measurement instruction information, transmission of power supply signals, and acquisition of power reception amount information, while changing the value of the power supply parameter. The AP 91 determines a power supply parameter appropriate for the wireless LAN terminal, and intermittently supplies power to the wireless LAN terminal by using the determined power supply parameter, within an ordinary period following the measurement process. Examples of a wireless LAN terminal having a power supply request include a wireless LAN terminal having a battery the remaining amount of which is less than a reference value. Alternatively, a request for updating a current power supply parameter may be generated because a necessary power reception amount cannot be obtained using the power supply parameter. Other examples are also possible. Details of the present sequence will be described below.

As shown in FIG. 20, the AP 91 acquires an access right to wireless media in accordance with CSMA/CA (Carrier Sense Multiple Access with Collision Avoidance), and transmits a power-supply request collecting frame 151 on the basis of the acquired access right. The power-supply request collecting frame 151 is a frame for inquiring the presence/absence of a power supply request (or a parameter update request). The receiver address of the request collecting frame is a broadcast address or a multicast address, for example. The transmitter address of the request collecting frame is the address of the AP 91. The transmitter address may be omitted. The form of the request collecting frame is not limited to a particular form. The fact that a frame is a request collecting frame may be indicated by Type and Subtype of the frame control field of the MAC header thereof. In IEEE802.11 standard, various types of frames can be defined by using Type and Subtype. The aforementioned trigger frame may be used as the request collecting frame.

The power-supply request collecting frame 151 is received by each of the wireless LAN terminals A, B. The signal of the power-supply request collecting frame 151 is inputted into the power receiver 136 of each of the wireless LAN terminals A, B, and the capacitor of the power receiver 136 is charged on the basis of the signal. The WLAN receiver 134 of each of the wireless LAN terminals A, B performs analysis to find out that the received frame 151 is a power-supply request collecting frame, and notifies the analysis result to the controller 135. The controller 135 of each of the wireless LAN terminals determines the presence/absence of a power supply request, and transmits, when determining the presence of a power supply request, a power-supply request frame. In the example shown in the drawing, the wireless LAN terminal A transmits a power-supply request frame 152. The receiver address (RA) of the power-supply request frame 152 is the address of the AP 91, and the transmitter address of the power-supply request frame 152 is the address of the wireless LAN terminal A. The transmitter address may be omitted. The form of the power-supply request frame 152 is not limited to a particular form. The power-supply request frame may be a frame which is newly defined using Type and Subtype, or a frame obtained by setting a power supply request in a reservation area of an existing frame in compliance with IEEE802.11 standard.

The AP 91 having received the power-supply request frame 152 only from the wireless LAN terminal A, determines to perform power reception amount measurement of only the wireless LAN terminal A. In order to set a transmission prohibition period, the AP 91 transmits a CTS-to-self frame 153. The CTS-to-self frame 153 is received by the wireless LAN terminal A and the wireless LAN terminal B. The wireless LAN terminal A and the wireless LAN terminal B set a transmission prohibition period on the basis of the value set in the Duration/ID field of the CTS-to-self frame 153. Within the transmission prohibition period, the AP 91 transmits, to the wireless LAN terminal A, a measurement instruction frame 154 that includes an instruction to measure a power reception amount and to specify a measurement period. The measurement period is included in the transmission prohibition period. The receiver address of the measurement instruction frame 154 is the address of the wireless LAN terminal A, and the transmitter address of the measurement instruction frame 154 is the address of the AP 91. The transmitter address may be omitted. The form of the measurement instruction frame is not limited to a particular form. A frame newly defined using Type and Subtype may be used as the measurement instruction frame. Alternatively, a measurement instruction and a measurement period may be set in a reserved area of an existing frame in compliance with IEEE802.11 standard.

During the measurement period, the AP 91 transmits a power supply signal 155 generated on the basis of a first parameter. The wireless LAN terminal A receives the power supply signal 155 through the power receiver 136 and charges the capacitor. The power reception amount measurer 137 measures a power reception amount from the start to the end of the measurement period. During the measurement period, a received signal may be inputted not to the WLAN receiver 134 but only to the power receiver 136. Alternatively, during the measurement period, the WLAN receiver 134 may be set to a power saving mode.

After the measurement period ends and the transmission prohibition period ends, the wireless LAN terminal A transmits a response frame including power reception amount information A1 based on the measured power reception amount. To transmit the response frame, it is assumed that an access right to a wireless medium is obtained in advance in accordance with CSMA/CA. The form of the response frame is not limited to a particular form. The response frame may be newly defined using Type and Subtype. Alternatively, the power reception amount information A1 may be set in a reserved area of an existing frame in compliance with IEEE802.11 standard.

Thereafter, the AP 91 repeats a measurement process of acquiring power reception amount information from the wireless LAN terminal A, while changing the value of the power supply parameter. For example, the AP 91 next transmits a CTS-to-self frame 156 and sets a transmission prohibition period, and subsequently, transmits a measurement instruction frame 157. During the measurement period instructed by the measurement instruction frame 157, the AP 91 transmits a power supply signal 158 generated on the basis of a second parameter to the wireless LAN terminal A. The wireless LAN terminal A measures a power reception amount, and transmits a response frame including power reception amount information A2 based on the measured power reception amount.

As described above, the AP 1 can acquire, from the wireless LAN terminal A, highly accurately measured power reception amount information with respect to each of the plurality of parameters. The AP 1 determines a parameter to be applied to the wireless LAN terminal 2, on the basis of information on a plurality of power reception amounts acquired from the wireless LAN terminal A. For example, the AP 1 selects a parameter with which a power reception amount becomes the largest.

As described above, according to the present embodiment, the AP can acquire highly accurately measured power reception amount information from the wireless LAN terminal, which is the receiver of a power supply signal generated on the basis of a parameter.

Eighth Embodiment

Figure 21:
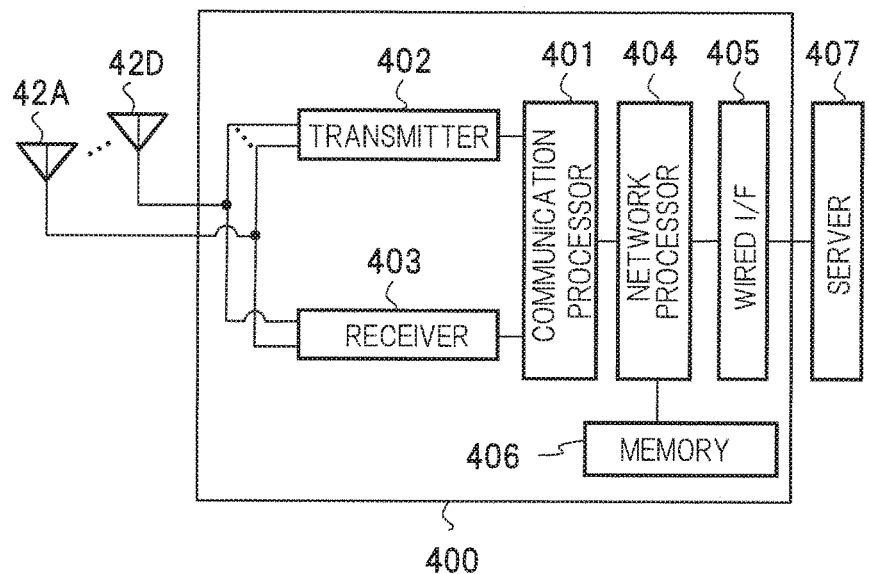
FIG. 21 is a function block diagram of an access point or a wireless LAN terminal according to a tenth embodiment.

FIG. 21 is a functional block diagram of a base station (access point) 400 according to an eight embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. The communication processor 401 has functions similar to the controller and the frame generator described in the first to seventh embodiments. The transmitter 402 and the receiver 403 have functions similar to the WLAN transmitter and the WLAN receiver described in the first to seventh embodiments. The network processor 404 has functions similar to the upper layer processor than MAC. The communication processor 401 may internally possess a buffer for transferring data to and from the network processor 404. The buffer may be a volatile memory, such as an SRAM or a DRAM, or may be a non-volatile memory, such as a NAND or an MRAM. In the following explanation, a terminal indicates a WLAN terminal.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly. In this case, a wireless I/F may be employed instead of the wired I/F 405.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) according to the present invention can be applied for the base station in the first to seventh embodiments. The transmission of the frame, the data or the packet used in the first to seventh embodiments may be carried out based on the cached data stored in the memory 406. Also, information obtained based on the frame, the data or the packet received by the base station in the first to seventh embodiments may be cached in the memory 406. The frame transmitted by the base station in the first to seventh embodiments may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

In the present embodiment, although the base station with the cache function is described, a terminal (STA) with the cache function can also be realized by the same block configuration as FIG. 21. In this case, the wired I/F 405 may be omitted. The transmission, by the terminal, of the frame, the data or the packet used in first embodiment may be carried out based on the cached data stored in the memory 406. Also, information obtained based on the frame, the data or the packet received by the terminal in first to seventh embodiments may be cached in the memory 406. The frame transmitted by the terminal in the first embodiment may include the cached data or information based on the cached data. The information based on the cached data may include information on a size of the data, a size of a packet required for transmission of the data. The information based on the cached data may include a modulation scheme required for transmission of the data. The information based on the cached data include information on existence or non-existence of data addressed to the terminal.

Ninth Embodiment

Figure 22:
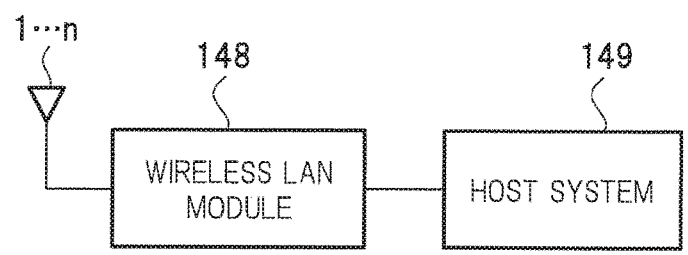
FIG. 22 illustrates an overall configuration example of the wireless LAN terminal or the access point.

FIG. 22 shows an example of entire configuration of a terminal (WLAN terminal) or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

Tenth Embodiment

FIG. 23 shows an example of hardware configuration of a wireless communication device mounted in a WLAN terminal or a BLE terminal. In case of having both functions of WLAN and BLE, the configuration shown in the figure may be provided correspondingly to each function. The functions of WLAN and BLE may be mounted in one chip or in different chips. The wireless communication device does not necessarily provide all of elements shown in the figure. A part of the elements may be omitted or replaced, or additional element may be added.

At least one antenna 247 is included in the example of configuration. When a plurality of antennas are included, a plurality of sets of a transmission system (216 and 222 to 225), a reception system (217, 232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the LNA 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Eleventh Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are successfully shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection, there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in the IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of the IEEE802.11 wireless LAN is described. There are several types of frame intervals used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in the IEEE802.11 wireless LAN, and a strict period from a previous frame is not discussed. Therefore, the definition is followed in the explanation of the IEEE802.11 wireless LAN system. In the IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once.

EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 24:
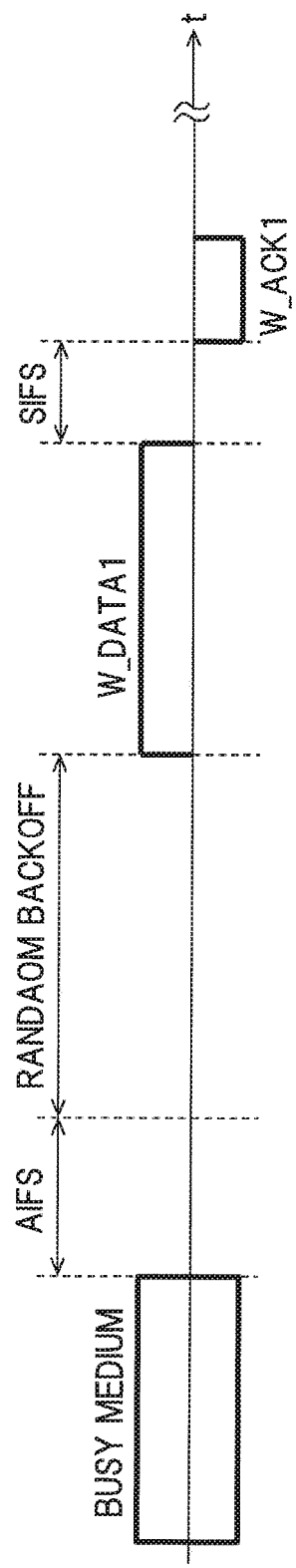
FIG. 24 shows an example of frame exchange during a contention period.

Here, FIG. 24 illustrates one example of frame exchange in a competitive period based on the random access in the IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in the IEEE802.11 wireless LAN), the default values are defined.

For example, in the definition of 802.11ac, with an assumption that SIFS is 16 µs and the slot time is 9 and thereby PIFS is 25 µs, DIFS is 34 the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS. In the present embodiment, a wireless communication system using parameters at such interframe spaces is assumed to be an interfering system with a wide communication range.

Note that the frames described in the embodiments may indicate not only things called frames in, for example, IEEE 802.11 standard, but also things called packets, such as Null Data.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. Moreover, the term "circuitry" may refer one or more electric circuits disposed on a single chip, or may refer one or more electric circuits disposed on a plurality of chips more than one chip or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device comprising:
    a first transmitter configured to transmit a first frame to instruct prohibition of transmission to a first wireless communication device, and to transmit a signal to a second wireless communication device during a period in which the transmission is prohibited;
    a first receiver configured to receive power reception amount information corresponding to the signal after the signal is transmitted; and
    a second transmitter configured to transmit measurement instruction information specifying a first measurement period, wherein
    the first transmitter is configured to transmit the signal during the first measurement period.

2. The wireless communication device according to claim 1, wherein
    the first transmitter is configured to generate the signal on the basis of a parameter specifying weights for a plurality of first antennas, and transmit the signal to a plurality of second wireless communication devices, and
    the first receiver is configured to receive the power reception information from the second wireless communication devices.

3. The wireless communication device according to claim 1, further comprising a second receiver, wherein
    the measurement instruction information specifies a second measurement period,
    the second receiver is configured to receive, during the second measurement period, a second frame a transmission source of which is the first wireless communication device, and
    the first receiver is configured to receive reception power amount information corresponding to the first measurement period and reception power amount information corresponding to the second measurement period.

4. The wireless communication device according to claim 3, wherein the first transmitter is configured to transmit, during the second measurement period, a third frame addressed to the first wireless communication device.

5. The wireless communication device according to claim 1, wherein
    the first transmitter has a first mode to periodically transmit a beacon frame of a first length and a second mode to periodically transmit a beacon frame of a second length shorter than the first length, and is configured to execute the first mode after start-up of the wireless communication device, and shift the first mode to the second mode when a predetermined condition is established.

6. The wireless communication device according to claim 1, wherein the first transmitter is configured to intermittently transmit a frame addressed to the wireless communication device after start-up of the wireless communication device, and stop intermittent transmission of the frame when a predetermined condition is established.

7. The wireless communication device according to claim 1, further comprising
    at least one first antenna, and
    at least one second antenna, wherein
    the first transmitter is configured to transmit the first frame and transmit the signal, through the first antenna, and
    the first receiver is configured to receive the power reception amount information through the second antenna.

8. The wireless communication device according to claim 1, further comprising
    at least one first antenna, wherein
    the first transmitter is configured to transmit the first frame and transmit the signal, via the first antenna, and
    the first receiver is configured to receive the reception power amount information via the first antenna.

9. A wireless communication method performed by a wireless communication device, comprising:
    transmitting a first frame to instruct prohibition of transmission to a first wireless communication device;
    transmitting a signal to a second wireless communication device during a period in which the transmission is prohibited;
    receiving power reception amount information corresponding to the signal after the signal is transmitted;
    transmitting measurement instruction information specifying a first measurement period; and transmitting the signal during the first measurement period.

10. The wireless communication method according to claim 9, further comprising
generating the signal on the basis of a parameter specifying weights for a plurality of first antennas, and transmitting the signal to a plurality of second wireless communication devices, and
receiving the power reception information from the second wireless communication devices.

11. The wireless communication method according to claim 9, further wherein
the measurement instruction information specifies a second measurement period,
the method comprising: receiving, during the second measurement period, a second frame a transmission source of which is the first wireless communication device, and
receiving reception power amount information corresponding to the first measurement period and reception power amount information corresponding to the second measurement period.

12. The wireless communication method according to claim 11, further comprising: transmitting, during the second measurement period, a third frame addressed to the first wireless communication device.

13. The wireless communication method according to claim 9, wherein
executing a first mode to periodically transmit a beacon frame having a first length after start-up of the wireless communication device, and shifting the first mode to the second mode when a predetermined condition is established, the second mode being a mode to periodically transmit a beacon frame having a second length shorter than the first length.

14. The wireless communication method according to claim 9, further comprising: transmitting intermittently a frame addressed to the wireless communication device after start-up of the wireless communication device, and stopping intermittent transmission of the frame when a predetermined condition is established.

15. The wireless communication method according to claim 9, further comprising
transmitting the first frame and transmitting the signal, through a first antenna, and
receiving the power reception amount information through a second antenna.

16. The wireless communication method according to claim 9, further comprising
transmitting the first frame and transmitting the signal, via a first antenna, and
receiving the reception power amount information via the first antenna.

* * * * *